United States Patent
Li et al.

(10) Patent No.: US 10,932,289 B2
(45) Date of Patent: Feb. 23, 2021

(54) SIGNAL TRANSMISSION METHOD AND DEVICE

(71) Applicant: HUAWEI TECHNOLOGIES CO., LTD., Guangdong (CN)

(72) Inventors: Junchao Li, Shanghai (CN); Chi Zhang, Shanghai (CN); Zhengwei Gong, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/369,175

(22) Filed: Mar. 29, 2019

(65) Prior Publication Data

US 2019/0230686 A1   Jul. 25, 2019

Related U.S. Application Data

(63) Continuation of application No. PCT/CN2017/103848, filed on Sep. 28, 2017.

(30) Foreign Application Priority Data

Sep. 30, 2016 (CN) .......................... 201610878977.2

(51) Int. Cl.

| | |
|---|---|
| *H04L 12/50* | (2006.01) |
| *H04W 72/12* | (2009.01) |
| *H04W 56/00* | (2009.01) |
| *H04L 5/14* | (2006.01) |
| *H04L 5/00* | (2006.01) |
| *H04W 72/04* | (2009.01) |

(52) U.S. Cl.
CPC ....... *H04W 72/1263* (2013.01); *H04L 5/0073* (2013.01); *H04L 5/1469* (2013.01); *H04W 56/00* (2013.01); *H04W 72/0446* (2013.01); *H04L 5/0007* (2013.01); *H04L 5/1438* (2013.01)

(58) Field of Classification Search
CPC ........................................................ H04L 12/50
USPC ........................................................... 370/400
See application file for complete search history.

(56) References Cited

U.S. PATENT DOCUMENTS

| 10,193,734 B2 * | 1/2019 | Shin .................... H04L 27/2675 |
| 2014/0293883 A1 | 10/2014 | Wang et al. |
| 2017/0005774 A1 | 1/2017 | Choi et al. |

FOREIGN PATENT DOCUMENTS

| CN | 105122716 A | 12/2015 |
| EP | 3474587 A1 | 4/2019 |
| WO | 2015123834 A1 | 8/2015 |

OTHER PUBLICATIONS

Choi et al., "A novel decentralized time slot allocation algorithm in dynamic TDD system," 2006 3rd IEEE Consumer Communications and Networking Conference, Jan. 2006, 5 pages.

(Continued)

*Primary Examiner* — Dang T Ton
(74) *Attorney, Agent, or Firm* — Fish & Richardson P.C.

(57) ABSTRACT

Example methods and apparatus for transmitting a signal transmission method and a device are disclosed. One method includes transmitting a signal based on a predefined transmission pattern by a communications device. The transmission pattern defines that a non-first downlink timing boundary in a downlink time domain unit is later than or earlier than a first downlink timing boundary is defined, or that an uplink timing boundary in an uplink time domain unit is earlier than or later than the first downlink timing boundary.

19 Claims, 13 Drawing Sheets

(56) References Cited

OTHER PUBLICATIONS

Lin et al., "Dynamic TDD interference mitigation by using Soft Reconfiguration," 11th EAI International Conference on Heterogeneous Networking for Quality, Reliability, Security and Robustness (QSHINE), Aug. 2015, 6 pages.
Mogensen et al., "Centimeter-Wave Concept for 5G Ultra-Dense Small Cells," 2014 IEEE 79th Vehicular Technology Conference (VTC Spring), IEEE, May 2014, 6 pages.
Office Action issued in Chinese Application No. 201610878977.2 dated Oct. 31, 2018, 6 pages.
PCT International Search Report and Written Opinion issued in International Application No. PCT/CN2017/103848 dated Dec. 28, 2017, 22 pages (with English translation).
R1-131458—Ericsson et al., "On efficient signaling of Dynamic TDD," 3GPP TSG-RAN WG1 #72bis, Chicago, U.S.A., Apr. 15-19, 2013, 3 pages.
R1-132075—HTC, "Discussion on TDD UL-DL Reconfiguration in TDD eIMTA Systems," 3GPP TSG RAN WG1 Meeting #73, Fukuoka, Japan, May 20-24, 2013, 5 pages.
R1-140594—CMCC, "Discussion on intra-operator and inter-operator synchronization for small cell enhancement," 3GPP TSG RAN WG1 Meeting #76, Prague, Czech Republic, Feb. 10-14, 2014, 7 pages.
R1-162883—Nokia et al., "Basic principles for the 5G New Radio access technology," 3GPP TSG-RAN WG1 #84bis, Busan, Korea, Apr. 11-15, 2016, 6 pages.
R1-162893—Nokia et al., "Basic frame structure principles for 5G new radio," 3GPP TSG-RAN WG1 Meeting #84bis, Busan, Korea, Apr. 11-15, 2016, 7 pages.
R1-163105—NTT DOCOMO, Inc, "Overview of eMBB operation for NR access technology," 3GPP TSG RAN WG1 Meeting #84bis, Busan, Korea, Apr. 11-15, 2016, 3 pages.
R1-163222—Ericsson, "Waveform for NR," 3GPP TSG-RAN WG1 #84bis, Busan, South Korea, Apr. 11-15, 2016, 5 pages.
R1-163226—Ericsson et al., "Frame structure for NR," TSG-RAN WG1 #84bis, Busan, South Korea, Apr. 11-15, 2016, 2 pages.
R1-163622—Ericsson, "On subframes," TSG-RAN WG1 #84bis, Busan, South Korea, Apr. 11-15, 2016, 1 page.
Extended European Search Report issued in European Application No. 17854917.6 dated Jul. 23, 2019, 10 pages.
R1-167305—Nokia et al., "On the cross-link interference mitigation," 3GPP TSG-RAN WG1 #86, Gothenburg, Sweden, Aug. 22-26, 2016, 3 pages.
R1-166491—ZTE et al., "Considerations about symbol boundary alignment," 3GPP TSG RAN WG1 Meeting #86, Gothenburg, Sweden, Aug. 22-26, 2016, 10 pages.

* cited by examiner

SIGNAL TRANSMISSION METHOD AND DEVICE

CROSS-REFERENCE TO RELATED APPLICATIONS

This application is a continuation of International Application No. PCT/CN2017/103848, filed on Sep. 28, 2017, which claims priority to Chinese Patent Application No. 201610878977.2, filed on Sep. 30, 2016. The disclosures of the aforementioned applications are hereby incorporated by reference in their entireties.

TECHNICAL FIELD

Embodiments of the present invention relate to the field of wireless communications technologies, and in particular, to a signal transmission method and a device.

BACKGROUND

A dynamic time division duplex (English full name: Dynamic Time Division Duplex, D-TDD for short) technology is to rapidly switch uplink-downlink D-TDD subframes based on uplink-downlink traffic load in a network, to adapt to a specific service demand in the network. Therefore, a throughput of uplink-downlink services in the network can be increased by using the D-TDD technology. Because intra-frequency cross interference exists between neighboring cells in D-TDD, as shown in FIG. 1-1, downlink transmission of an intra-frequency network side device in a neighboring cell causes interference to uplink receiving of a network side device in a local cell, and uplink transmission of user equipment in the neighboring cell causes interference to downlink receiving of the user equipment in the local cell. The cross interference severely affects system performance, and also limits gains brought by the D-TDD.

In a discussion for a New Radio (English full name: New Radio, NR for short) standard in the 3rd Generation Partnership Project (English full name: 3rd Generation Partnership Project, 3GPP for short), independent uplink-downlink subframes tend to be defined, and a time domain unit structure "including both uplink and downlink" can be implemented by using timing. According to such a definition, there are totally four possible time domain unit structures: a downlink-only time domain unit structure, an uplink-only time domain unit structure, a partial-downlink time domain unit structure, and a partial-uplink time domain unit structure. However, as shown in FIG. 1-2, because downlink-to-uplink switching delays are at different time domain locations in different time domain unit structures, symbols for cells using different time domain unit structures are not aligned in time domain. Consequently, it is inconvenient to cancel cross interference between network side devices and user equipments in a D-TDD scenario.

SUMMARY

Embodiments of the present invention provide a signal transmission method and a device, to resolve a prior-art problem of transmission interference caused by misalignment of symbols between cells in time domain.

A first aspect provides a signal transmission method. In the method, a transmission pattern is predefined. When transmitting a signal, each communications device in a cell needs to follow a transmission rule (including transmitting an uplink signal and a downlink signal) indicated by the transmission pattern. When each communications device needs to transmit a signal, the communications device transmits the signal based on the predefined transmission pattern. Transmitting the signal includes sending and/or receiving the signal. For a terminal device, transmitting a downlink signal is receive timing, and transmitting an uplink signal is transmit timing.

The transmission pattern in this embodiment of the present invention may include a downlink time domain unit and/or an uplink time domain unit. The downlink time domain unit includes $N_1$ downlink time domain regions, and each downlink time domain region has a downlink timing boundary, where $N_1 \geq 2$. The uplink time domain unit includes $N_2$ uplink time domain regions, and each uplink time domain region has an uplink timing boundary, where $N_2 \geq 2$. The transmission pattern defined in this embodiment of the present invention satisfies at least one of the following:

A definition of the downlink timing boundary is: a timing boundary of an $i^{th}$ downlink time domain region in the downlink time domain unit is later than a first downlink timing boundary, where i is a positive integer greater than 1 and less than or equal to $N_1$. The first downlink timing boundary is the first downlink timing boundary in the downlink time domain unit in time domain. That an $i^{th}$ downlink timing boundary is later than the first downlink timing boundary is that at least one downlink timing boundary other than the first downlink timing boundary in the downlink time domain unit may be defined to be later than the first downlink timing boundary. A specific timing quantity of downlink timing boundaries defined to be later than the first downlink timing boundary is not limited in this embodiment of the present invention. In addition, the first downlink timing boundary in this embodiment of the present invention is the same as a timing boundary in the entire downlink time domain unit.

Alternatively, another definition of the downlink timing boundary is: a downlink timing boundary of a $j^{th}$ time domain region in the downlink time domain unit is earlier than a first downlink timing boundary, where j is a positive integer greater than 1 and less than or equal to $N_1$. That a $j^{th}$ downlink timing boundary is earlier than the first downlink timing boundary is that at least one downlink timing boundary other than the first downlink timing boundary in the downlink time domain unit may be defined to be earlier than the first downlink timing boundary. A specific timing quantity of downlink timing boundaries defined to be earlier than the first downlink timing boundary is not limited in this embodiment of the present invention.

Alternatively, a definition of the uplink timing boundary is: a timing boundary of a $k^{th}$ uplink time domain region in the uplink time domain unit is earlier than a first downlink timing boundary, where $k^{th}$ is a positive integer greater than or equal to 1 and less than or equal to $N_2$. That a $k^{th}$ uplink timing boundary is earlier than the first downlink timing boundary is that at least one uplink timing boundary in the uplink time domain unit may be defined to be earlier than the first downlink timing boundary. A specific timing quantity of uplink timing boundaries defined to be earlier than the first downlink timing boundary is not limited in this embodiment of the present invention.

Alternatively, another definition of the uplink timing boundary is: an uplink timing boundary of an $m^{th}$ time domain region in the uplink time domain unit is later than a first downlink timing boundary, where m is a positive integer greater than 1 and less than or equal to $N_2$. That an $m^{th}$ uplink timing boundary is later than the first downlink timing boundary is that at least one uplink timing boundary in the uplink time domain unit may be defined to be later than the first downlink timing boundary. A specific timing quantity of uplink timing boundaries defined to be later than the first downlink timing boundary is not limited in this embodiment of the present invention either.

A downlink timing boundary of the $x^{th}$ downlink region is stipulated as follows: receive timing of a symbol having an index number p in the $x^{th}$ downlink time domain region is $x^{th}$ downlink timing boundary+p*$T_{symbol}$, where $T_{symbol}$ is a length occupied by a symbol in time domain, and x is i or j.

An uplink timing boundary of the $y^{th}$ uplink region is stipulated as follows: transmit timing of a symbol having an index number p in the $y^{th}$ uplink time domain region is $y^{th}$ downlink timing boundary+p*$T_{symbol}$, where y is k or m, p is any positive integer from 0 to t−1, t is a total quantity of symbols included in a time domain unit, and an index number of a symbol starts from 0 and is arranged in ascending order of time domain.

In actual application, in addition to the timing separately defined for the uplink timing boundary and the downlink timing boundary that are described in the foregoing content, there may be other combinations. For example, when the downlink timing boundary is defined to be later than the first downlink timing boundary, the uplink timing boundary may be further defined to be later than or earlier than the first downlink timing boundary: or when the downlink timing boundary is defined to be later than the first downlink timing boundary, the uplink timing boundary may be further defined to be later than or earlier than the first downlink timing boundary. In comparison with an existing mechanism, in this embodiment of the present invention, timing adjustment is performed on the existing uplink and/or downlink timing boundary, or a new uplink or downlink timing boundary or both are defined. The communications device transmits the signal by using the transmission pattern defined in this embodiment of the present invention, reducing symbol misalignment, and reducing interference caused by the symbol misalignment correspondingly. This facilitates cancellation of cross interference between communications devices. In addition, a timing definition combination manner that is specifically used is not limited in this embodiment of the present invention.

It should be noted that, when the timing boundary of the $i^{th}$ downlink time domain region is defined to be later than the first downlink timing boundary, and if the downlink timing boundary of the $j^{th}$ time domain region is defined to be earlier than the first downlink timing boundary, i≠j needs to be satisfied. Likewise, when the timing boundary of the $k^{th}$ uplink time domain region is defined to be earlier than the first downlink timing boundary, and if the uplink timing boundary of the $m^{th}$ time domain region is defined to be later than the first downlink timing boundary, k≠m needs to be satisfied.

The following separately defines timing of the uplink timing boundary and the downlink timing boundary.

1. Timing is defined for the uplink timing boundary in the uplink time domain unit:

A1. For example, when k=2, timing is defined for an uplink timing boundary of a second uplink time domain region in the uplink time domain unit. The uplink timing boundary of the second uplink time domain region may be referred to as a second uplink timing boundary for short, and an uplink timing boundary of another uplink time domain region and a downlink timing boundary of a downlink time domain region are defined in a similar manner. Details are not described. The second uplink timing boundary is earlier than the first downlink timing boundary by duration $T_2^{ul}=T_1^{ul}+\Delta T_1^{ul}$, where $T_1^{ul}$ is duration by which the sending timing boundary in the uplink time domain unit is earlier than the first downlink timing boundary.

$\Delta T_1^{ul}$ is an offset between the second uplink timing boundary and a first uplink timing boundary, and $\Delta T_1^{ul}$ is a predefined first fixed value or any value in a predefined first set.

When the communications device sends a transmission signal based on the second uplink timing boundary, a quantity of elements in the first set is related to a quantity of symbols included in the second uplink time domain region, and the second uplink time domain region includes a symbol transmitted based on the second uplink timing boundary.

B1. For example, when k=3, timing is defined for an uplink timing boundary of a third uplink time domain region in the uplink time domain unit, and a third uplink timing boundary is earlier than the first downlink timing boundary by duration $T_3^{ul}=T_1^{ul}+\Delta T_2^{ul}$, where $\Delta T_2^{ul}$ is an offset of the third uplink timing boundary relative to the first uplink timing boundary. $\Delta T_2^{ul}$ is a predefined second fixed value or any value in a predefined second set.

When a symbol is sent based on the third uplink timing boundary, a quantity of elements in the second set is related to a quantity of symbols included in the third uplink time domain region, and the third uplink time domain region includes a symbol transmitted based on the third uplink timing boundary.

A new third uplink timing boundary is defined, so that a symbol sent based on the third uplink timing boundary is aligned with a symbol that is received based on a downlink timing boundary and that has mutual interference with the symbol sent based on the third uplink timing boundary, when both the symbols are received at a network side. This facilitates interference cancellation.

2. Timing is defined for the downlink timing boundary in the downlink time domain unit:

A2. For example, when i=2, timing is defined for a downlink timing boundary of a second downlink time domain region in the downlink time domain unit, and a second downlink timing boundary is later than the first downlink timing boundary by duration $T_2^{dl}$, $T_2^{dl}=\Delta T_1^{dl}$, where $\Delta T_1^{dl}$ is a predefined third fixed value or any value in a predefined third set.

When a symbol is received based on the second downlink timing boundary, a quantity of elements in the third set is related to a quantity of symbols included in the second downlink time domain region, and the second downlink time domain region includes a symbol transmitted based on the second uplink timing boundary. New receive timing of the second downlink time domain region is defined, so that a symbol in the second downlink time domain region is aligned with a symbol that is in an uplink time domain region and that has mutual interference with the symbol in the second downlink time domain region, when both the symbols are received at a network side. This facilitates interference cancellation.

B2. When i=3, timing is defined for a downlink timing boundary of a third downlink time domain region in the downlink time domain unit, and a third downlink timing boundary is later than the first downlink timing boundary by duration $T_3^{dl}$, $T_3^{dl}=\Delta T_2^{dl}$, where $\Delta T_2^{dl}$ is a predefined fourth fixed value or any value in a predefined fourth set.

When a symbol is received based on the second downlink timing boundary, a quantity of elements in the fourth set is related to a quantity of symbols included in the third downlink time domain region, and the third downlink time domain region includes a symbol transmitted based on the third downlink timing boundary.

A new third downlink timing boundary is defined, so that a symbol received based on the third downlink timing boundary is aligned with a symbol that is sent in an uplink time domain region and that has mutual interference with the symbol received based on the third downlink timing boundary, when both the symbols are received at the network side. This facilitates interference cancellation.

3. Timing is defined for the uplink timing boundary in the uplink time domain unit:

A3. For example, when m=2, timing is defined for an uplink timing boundary of a second uplink time domain region in the uplink time domain unit, and a second uplink timing boundary is earlier than the first downlink timing boundary by duration $T_2^{dl'} = \Delta T_1^{dl'}$, where $\Delta T_2^{dl'}$ is a predefined first fixed value or any value in a predefined fifth set. When a symbol is sent based on the second uplink timing boundary, a quantity of elements in the fifth set is related to a quantity of symbols included in the second uplink time domain region, and the second uplink time domain region includes a symbol transmitted based on the second uplink timing boundary.

B3. When m=3, timing is defined for an uplink timing boundary of a third uplink time domain region in the uplink time domain unit, and a third uplink timing boundary is later than the first downlink timing boundary by duration $T_3^{ul'} = \Delta T_2^{ul'}$, where $T_1^{ul'}$ is duration by which the first uplink timing boundary is earlier than the first downlink timing boundary, $\Delta T_2^{ul'}$ is an offset of the uplink timing boundary of the third uplink time domain region relative to the first uplink timing boundary, and $\Delta T_2^{ul'}$ is a predefined sixth fixed value or any value in a predefined sixth set.

When a symbol is sent based on the third uplink timing boundary, a quantity of elements in the sixth set is related to a quantity of symbols included in the third uplink time domain region, and the third uplink time domain region includes a symbol transmitted based on the third uplink timing boundary.

A new second uplink timing boundary is defined, so that a symbol sent based on the second uplink timing boundary is aligned with a symbol that is received based on a downlink timing boundary and that has mutual interference with the symbol sent based on the second uplink timing boundary, when both the symbols are received at a network side. This facilitates interference cancellation.

4. Timing is defined for the downlink timing boundary in the downlink time domain unit:

A4. For example, when j=2, timing is defined for a downlink timing boundary of a second downlink time domain region in the downlink time domain unit, and a second downlink timing boundary is earlier than the first downlink timing boundary by duration $T_2^{dl'}$, $T_2^{dl'} = \Delta T_1^{dl'}$, where $\Delta T_1^{dl'}$ is a predefined seventh fixed value or any value in a predefined seventh set.

When a symbol is received based on the second downlink timing boundary, a quantity of elements in the seventh set is related to a quantity of symbols included in the second downlink time domain region, and the second downlink time domain region includes a symbol transmitted based on the second downlink timing boundary. A new second downlink timing boundary is defined, so that a symbol received based on the second downlink timing boundary is aligned with a symbol that is sent based on an uplink timing boundary and that has mutual interference with the symbol received based on the second downlink timing boundary, when both the symbols are received at a network side. This facilitates interference cancellation.

B4. When j=3, timing is defined for a downlink timing boundary of a third downlink time domain region in the downlink time domain unit, and a third downlink timing boundary is earlier than the first downlink timing boundary by duration $T_3^{dl'}$, $T_3^{dl'} = \Delta T_2^{dl'}$, where $\Delta T_2^{dl'}$ is a predefined eighth fixed value or any value in a predefined eighth set.

When a symbol is received based on the third downlink timing boundary, a quantity of elements in the eighth set is related to a quantity of symbols included in the third downlink time domain region, and the third downlink time domain region includes a symbol transmitted based on the third downlink timing boundary. A new third downlink timing boundary is defined, so that a symbol received based on the third downlink timing boundary is aligned with a symbol that is sent based on an uplink timing boundary and that has mutual interference with the symbol received based on the third downlink timing boundary, when both the symbols are received at the network side. This facilitates interference cancellation.

A second aspect of the embodiments of the present invention provides a communications device, having a function of implementing the signal transmission method provided in the first aspect. The function may be implemented by hardware, or may be implemented by hardware by executing corresponding software. The hardware or the software includes one or more modules corresponding to the foregoing function. The module may be software and/or hardware.

In a possible design, the communications device includes:

a processing unit, configured to determine a preset transmission pattern; and a transceiver unit, configured to transmit a signal based on the transmission pattern determined by the processing unit.

The transmission pattern includes a downlink time domain unit and/or an uplink time domain unit. The downlink time domain unit includes $N_1$ downlink time domain regions, and each downlink time domain region has a downlink timing boundary; and the uplink time domain unit includes $N_2$ uplink time domain regions, and each uplink time domain region has an uplink timing boundary, where $N_1 \geq 2$, and $N_2 \geq 2$. The transmission pattern satisfies at least one of the following:

a downlink timing boundary of an $i^{th}$ downlink time domain region in the downlink time domain unit is later than a first downlink timing boundary, where i is a positive integer greater than 1 and less than or equal to $N_1$;

a downlink timing boundary of a $j^{th}$ downlink time domain region in the downlink time domain unit is earlier than a first downlink timing boundary, where j is a positive integer greater than 1 and less than or equal to $N_1$;

an uplink timing boundary of a $k^{th}$ uplink time domain region in the uplink time domain unit is earlier than a first downlink timing boundary, where k is a positive integer greater than or equal to 1 and less than or equal to $N_2$; or an uplink timing boundary of an $m^{th}$ uplink time domain region in the uplink time domain unit is later than a first downlink timing boundary, where m is a positive integer greater than 1 and less than or equal to $N_2$.

A downlink timing boundary of the $x^{th}$ downlink region is stipulated as follows: receive timing of a symbol having an index number p in the $x^{th}$ downlink time domain region is $x^{th}$ downlink timing boundary+$p*T_{symbol}$, where $T_{symbol}$ is a length occupied by a symbol in time domain, and x is i or j.

An uplink timing boundary of the $y^{th}$ uplink region is stipulated as follows: transmit timing of a symbol having an index number p in the $y^{th}$ uplink time domain region is $y^{th}$ downlink timing boundary+p*$T_{symbol}$, where y is k or in, p is any positive integer from 0 to t−1, t is a total quantity of symbols included in a time domain unit, and an index number of a symbol starts from 0 and is arranged in ascending order of time domain.

In a possible design, the communications device includes: a processor, a transceiver, and a memory that are interconnected.

The memory is configured to store program code, and the processor is configured to invoke the program code in the memory to perform the technology described in the first aspect. For example, the processor controls the transceiver to send and receive a signal, and completes a step performed by the communications device in the foregoing method. Alternatively, the transceiver may be replaced with a receiver and a transmitter. The receiver and the transmitter may be a same physical entity or different physical entities. When being the same physical entity, the receiver and the transmitter may be referred to as a transceiver. The memory may be integrated in the processor, or may be disposed independent of the processor.

In a possible design, the communications device may include one or more processors and communications units. The one or more processors are configured to support the communications device in performing the corresponding function in the foregoing method. The communications unit is configured to support the communications device in communicating with another device, to implement receiving and/or sending functions.

Optionally, the communications device may further include one or more memories. The memory is configured to: be coupled to the processor, and store a program instruction and data that are required by the communications device. The one or more memories may be integrated with the processor, or may be disposed independent of the processor. This is not limited in this application.

The communications device may be a base station, a transmission point (transmission point, TP, or transmitting and receiving point, TRP), or the like. The communications unit may be a transceiver or a transceiver circuit.

Alternatively, the communications device may be a communications chip, and may be disposed in the base station or the transmission point TRP. The communications unit may be an input/output circuit or interface of the communications chip.

The communications device may be an intelligent terminal, a wearable device, or the like. The communications unit may be a transceiver or a transceiver circuit.

Alternatively, the communications device may be a communications chip, and may be disposed in user equipment. The communications unit may be an input/output circuit or interface of the communications chip.

In comparison with the prior art, in the technical solutions provided in the embodiments of the present invention, the communications device transmits the signal by using the predefined transmission pattern. In the transmission pattern, that a non-first downlink timing boundary in the downlink time domain unit is later than or earlier than the first downlink timing boundary is defined, and that any uplink timing boundary in the uplink time domain unit is later than or earlier than the first downlink timing boundary is defined. In this way, if the communications device transmits the signal by using the transmission pattern, symbols between different cells can be located at a same location in time domain, and therefore uplink-downlink interference between the cells is effectively canceled.

BRIEF DESCRIPTION OF DRAWINGS

FIG. 1-2 is a schematic diagram of a subframe structure in the prior art;

FIG. 2-1 is a structure of a time domain unit according to an embodiment of the present invention;

FIG. 2-2 is another structure of a time domain unit according to an embodiment of the present invention;

FIG. 2-3 is a structure of a time domain unit according to an embodiment of the present invention:

FIG. 2-4 is another structure of a time domain unit according to an embodiment of the present invention:

FIG. 3 is another structure of a time domain unit according to an embodiment of the present invention;

FIG. 4 is another schematic structural diagram of a time domain unit according to an embodiment of the present invention:

FIG. 5-1 is another schematic structural diagram of a time domain unit according to an embodiment of the present invention;

FIG. 5-2 is another schematic structural diagram of a time domain unit according to an embodiment of the present invention;

FIG. 5-3 is another schematic structural diagram of a time domain unit according to an embodiment of the present invention;

FIG. 5-4 is another schematic structural diagram of a time domain unit according to an embodiment of the present invention;

FIG. 5-5 is another schematic structural diagram of a time domain unit according to an embodiment of the present invention;

FIG. 6-1 is a schematic structural diagram of a time domain unit after timing advancement is defined for an uplink time domain region according to an embodiment of the present invention:

FIG. 6-2 is a schematic structural diagram of a time domain unit after timing advancement is defined for an uplink time domain region according to an embodiment of the present invention;

FIG. 6-3 is a schematic structural diagram of a time domain unit after timing advancement is defined for an uplink time domain region according to an embodiment of the present invention;

FIG. 7-1 is a schematic structural diagram of a time domain unit after timing delay is defined for an uplink time domain region according to an embodiment of the present invention;

FIG. 7-2 is a schematic structural diagram of a time domain unit after timing delay is defined for an uplink time domain region according to an embodiment of the present invention:

FIG. 7-3 is a schematic structural diagram of a time domain unit after timing delay is defined for an uplink time domain region according to an embodiment of the present invention;

FIG. 7-4 is a schematic structural diagram of a time domain unit after timing delay is defined for an uplink time domain region according to an embodiment of the present invention:

FIG. 8-1 is a schematic structural diagram of a time domain unit after timing advancement is defined for a downlink time domain region according to an embodiment of the present invention:

FIG. 8-2 is a schematic structural diagram of a time domain unit after timing advancement is defined for a downlink time domain region according to an embodiment of the present invention:

DESCRIPTION OF EMBODIMENTS

Figure 1:
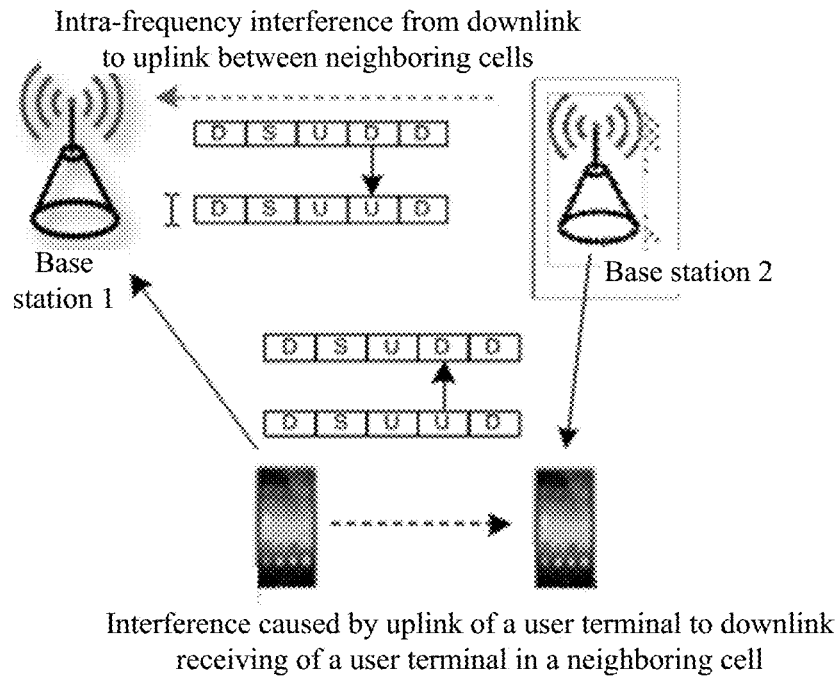
FIG. 1-1 is a schematic diagram of interference between cells in the prior art.

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person skilled in the art based on the embodiments of the present invention without creative efforts shall fall within the protection scope of the embodiments of the present invention.

In the specification, claims, and accompanying drawings in the embodiments of the present invention, the terms "first", "second", and so on are intended to distinguish between similar objects but do not necessarily indicate a specific order or sequence. It should be understood that the data used in such a way is interchangeable in proper circumstances so that the embodiments described herein can be implemented in other orders than the order illustrated or described herein. In addition, the terms "include" and "have" and any other variants thereof are intended to cover a non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. The module division in this specification is merely logical division, and there may be other division during implementation in actual application. For example, a plurality of modules may be combined or integrated into another system, or some features may be ignored or not performed. In addition, the displayed or discussed mutual couplings or direct couplings or communications connections may be implemented through some interfaces. The indirect couplings or communications connections between the modules may be implemented in electronic or another form, and this is not limited in this specification. In addition, modules or sub-modules described as separate components may be or may not be physically separated, or may be or may not be physical modules, or may be distributed into a plurality of circuit modules. Objectives of the solutions of the embodiments of the present invention may be achieved by selecting some or all of the modules according to actual requirements.

The embodiments of the present invention provide a signal transmission method and a device that are applied to the field of wireless communications technologies.

A time domain unit in the embodiments of the present invention mainly includes the following four structures: an uplink-only time domain structure, a downlink-only time domain structure, a partial-uplink time domain structure, and a partial-downlink time domain structure. The time domain unit may be referred to as a subframe, a timeslot, or the like, and may be used to indicate a time domain resource.

To resolve the foregoing technical problems, the embodiments of the present invention mainly provide the following technical solutions:

A preset transmission pattern is defined, to define delay or advancement to be performed on a downlink timing boundary of a downlink time domain region in a downlink time domain unit, and define advancement or delay to be performed on an uplink timing boundary of an uplink time domain region in an uplink time domain unit, so that in a same time domain unit, a symbol for downlink data sent by an access network device in a cell 1 based on the transmission pattern is aligned, at a network side receive end of a cell 2 adjacent to the cell 1, with a symbol for uplink data that is sent by a terminal device in the cell 2 based on the transmission pattern.

The transmission pattern is used to instruct a communications device to send a signal according to a transmission rule in the transmission pattern, and the transmission pattern is preconfigured in the communications device. The transmission pattern may include at least one downlink time domain unit and at least one uplink time domain unit. Both the uplink time domain unit and the downlink time domain unit are predefined time domain structures. A time domain structure divided in time domain is not limited in the embodiments of the present invention.

The downlink time domain unit defines at least $N_1$ downlink timing boundaries, and each downlink time domain unit includes at least one downlink time domain region in time domain, where $N_1 \geq 2$.

The uplink time domain unit defines at least $N_2$ uplink timing boundaries, and each downlink time domain unit includes at least one uplink time domain region in time domain, where $N_2 \geq 2$.

The downlink time domain region is a region used for downlink transmission in the downlink time domain unit, and the uplink time domain region is a region used for uplink transmission in the uplink time domain unit. In addition, each uplink/downlink time domain region includes a symbol in time domain. A maximum quantity of symbols included in an uplink time domain region is related to a division structure of the uplink time domain unit in time domain, and a maximum quantity of symbols included in a downlink time domain region is related to a division structure of the downlink time domain unit in time domain. Specific division of an uplink/downlink time domain unit in time domain is not limited in the embodiments of the present invention.

The downlink timing boundary is a downlink timing boundary of each downlink time domain region in the downlink time domain unit. For example, an $x^{th}$ downlink timing boundary in the downlink time domain unit is stipulated as follows: receive timing of a symbol having an index number p in an $x^{th}$ downlink time domain region is:

downlink timing boundary of the $x^{th}$ downlink region+$p*T_{symbol}$, where x is i or j, $T_{symbol}$ is a length occupied by a symbol in time domain, P may be a positive integer from 0 to t−1, t is a total quantity of symbols included in a time domain unit, and an index number of a symbol starts from 0 and is arranged in ascending order of the time domain. The downlink timing boundary of the $x^{th}$ downlink time domain region may be referred to as the $i^{th}$ downlink timing boundary. A downlink timing boundary of another downlink time domain region and an uplink timing boundary of an uplink time domain region are defined in a similar manner. Details are not described again.

The uplink timing boundary is an uplink timing boundary of each uplink time domain region in the uplink time domain unit. For example, a $y^{th}$ uplink timing boundary in the uplink time domain unit is stipulated as follows: transmit timing of a symbol having an index number p in a $y^{th}$ uplink time domain region is:

uplink timing boundary of the $y^{th}$ uplink region+ $p*T_{symbol}$, where y is k or m.

In an actual scenario, when a timing boundary of a symbol in a downlink time domain region is to be determined, the first symbol #0 in the downlink time domain unit in which the symbol is located needs to be inferred based on an index number of the symbol, to find a first timing boundary. When there is only one downlink time domain region in the entire downlink time domain unit, a downlink timing boundary of the downlink time domain region is a first downlink timing boundary. An uplink timing boundary of an uplink time domain region is obtained in a similar manner.

The communications device in this application may be a network side device, or may be a terminal device. The network side device may be, but is not limited to, a base station or another type of transmission point device.

When the communications device is a network side device, a factor such as a propagation delay between the network side device and the terminal device needs to be considered. When the network side device sends a signal based on a timing definition of the downlink time domain unit in the transmission pattern, timing of the original downlink time domain unit may be advanced by one duration. When the network side device receives a signal based on a timing definition of the uplink time domain unit in the transmission pattern, timing of the original uplink time domain unit is delayed by one duration. A timing relationship between time domain regions still falls within the protection scope of the embodiments of the present invention. When the communications device is a terminal device, the terminal device may send a signal based on the timing of the uplink time domain unit defined in the transmission pattern, and receive a signal based on the timing of the downlink time domain unit defined in the transmission pattern. A communications device in each cell sends a signal based on a same defined transmission pattern, so that a downlink signal sent in a cell 1 and an uplink signal sent in another cell 2 have same receive timing at a network side receive end of the cell 2, or the downlink signal sent in the cell 1 and the uplink signal sent in the another cell 2 have same receive timing at a network side receive end of the cell 1.

The network side device in the embodiments of the present invention is a device connecting the terminal device to a wireless network, and is also referred to as a base station, including, but not limited to, an evolved NodeB (English full name: evolved Node Base, eNB for short), a radio network controller (English full name: Radio Network Controller, RNC for short), a NodeB (English full name: NodeB, NB for short), a base station controller (English full name: Base Station Controller, BSC for short), a base transceiver station (English full name: Base Transceiver Station, BTS for short), a home NodeB (for example, a home evolved NodeB, or a home NodeB, HNB for short), or a baseband unit (English full name: BaseBand Unit, BBU for short).

The terminal device in the embodiments of the present invention may be a device that provides a user with voice and/or data connectivity, a handheld device having a wireless connection function, or another processing device connected to a wireless modem. The terminal device may communicate with one or more core networks by using a radio access network (English full name: Radio Access Network, RAN for short). The terminal device may be a mobile terminal, such as a mobile phone (or referred to as a "cellular" phone) or a computer having a mobile terminal, for example, a portable, pocket-sized, handheld, computer built-in, or in-vehicle mobile apparatus, and exchanges voice and/or data with the radio access network. For example, the terminal device may be a device such as a personal communication service (English full name: Personal Communication Service, PCS for short) phone, a cordless telephone set, a Session Initiation Protocol (SIP) phone, a wireless local loop (Wireless Local Loop, WLL for short) station, or a personal digital assistant (English full name: Personal Digital Assistant, PDA for short). A wireless terminal may also be referred to as a system, a subscriber unit (Subscriber Unit), a subscriber station (Subscriber Station), a mobile station (Mobile Station), a mobile console (Mobile), a remote station (Remote Station), an access point (Access Point), a remote terminal (Remote Terminal), an access terminal (Access Terminal), a user terminal (User Terminal), a terminal device, a user agent (User Agent), a user device (User Device), or user equipment (User Equipment).

It should be noted that because a relationship between the downlink timing boundary of each downlink time domain region and a symbol index and a relationship between the uplink timing boundary of each uplink time domain region and a symbol index are predefined in the communications device, when transmitting a signal by using the transmission pattern, the communications device does not need to predetermine an index number of a symbol and predetermine, based on the index number, a timing boundary corresponding to the symbol, but can directly transmit the signal by using a predefined time domain unit structure.

According to the foregoing technical solutions, an interference cancellation operation mechanism can be optimized, and operation load and operation duration can be reduced, thereby facilitating cancellation of uplink-downlink interference.

The following describes a signal transmission method provided in an embodiment of the present invention by using an example. A downlink time domain unit and an uplink time domain unit corresponding to the downlink time domain unit are used as an example in this embodiment of the present invention. For another downlink time domain unit and another uplink time domain unit, refer to a timing rule defined in this embodiment of the present invention, for example, a definition of timing of a downlink timing boundary in a downlink subframe 1, and a definition of timing of an uplink timing boundary in an uplink subframe 1 corresponding to the downlink subframe 1. Definitions of timing of a downlink subframe and an uplink subframe of another subframe may be exactly the same as the definitions of the timing of the downlink subframe 1 and the downlink subframe 2. In this embodiment of the present invention, the timing of the uplink timing boundary and/or the downlink timing boundary may be defined, or timing adjustment such as timing delay or timing advancement may be performed on timing of the existing uplink timing boundary and/or downlink timing boundary. Alternatively, a new timing relationship between the uplink timing boundary and/or the downlink timing boundary may be defined. Details are not described in this embodiment of the present invention. The following separately describes a definition of receive timing of the downlink time domain region and/or a definition of transmit timing of the uplink time domain region.

In an implementation mechanism, timing is defined for the downlink time domain region.

Only receive timing of the downlink time domain region in the downlink time domain unit may be redefined, and timing advancement or timing delay may be performed on the receive timing of the downlink time domain region relative to a first downlink timing boundary. This facilitates interference cancellation to some extent, and can reduce symbol misalignment.

When delay is defined for receive timing of each downlink time domain region relative to the first downlink timing boundary, a timing rule A may be defined: a timing boundary of an $i^{th}$ downlink time domain region in the downlink time domain unit is later than the first downlink timing boundary, where i is a positive integer greater than 1 and less than or equal to $N_1$. The first downlink timing boundary is the first downlink timing boundary in the downlink time domain unit in time domain. That the downlink timing boundary of the i downlink region is later than the first downlink timing boundary means that at least one downlink timing boundary other than the first downlink timing boundary in the downlink time domain unit may be defined to be later than the first downlink timing boundary. A specific timing quantity of downlink timing boundaries defined to be later than the first downlink timing boundary is not limited in this embodiment of the present invention.

Figures 1, 2:
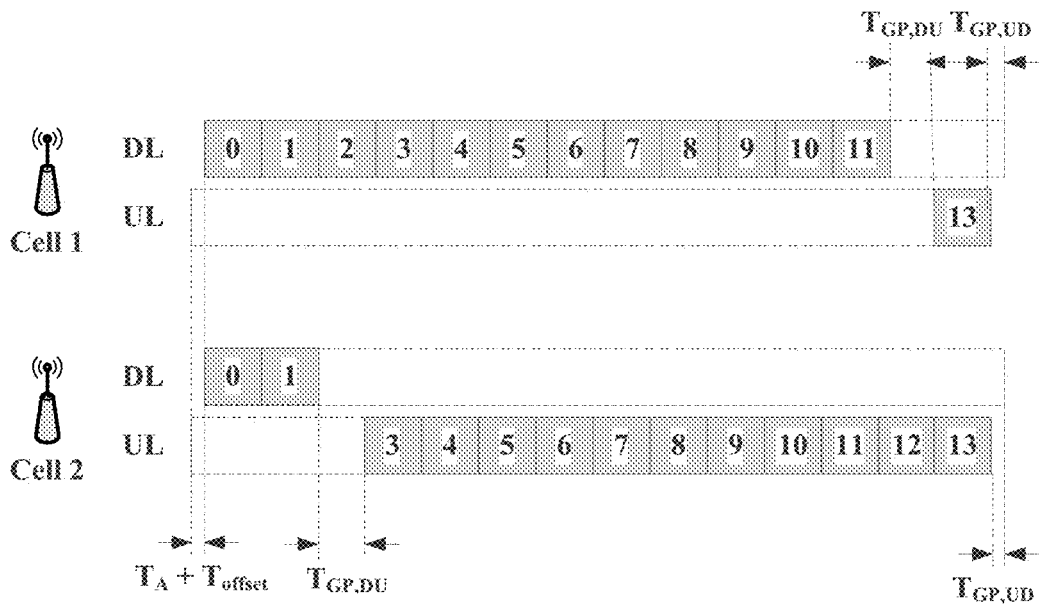
Figures 1, 2:
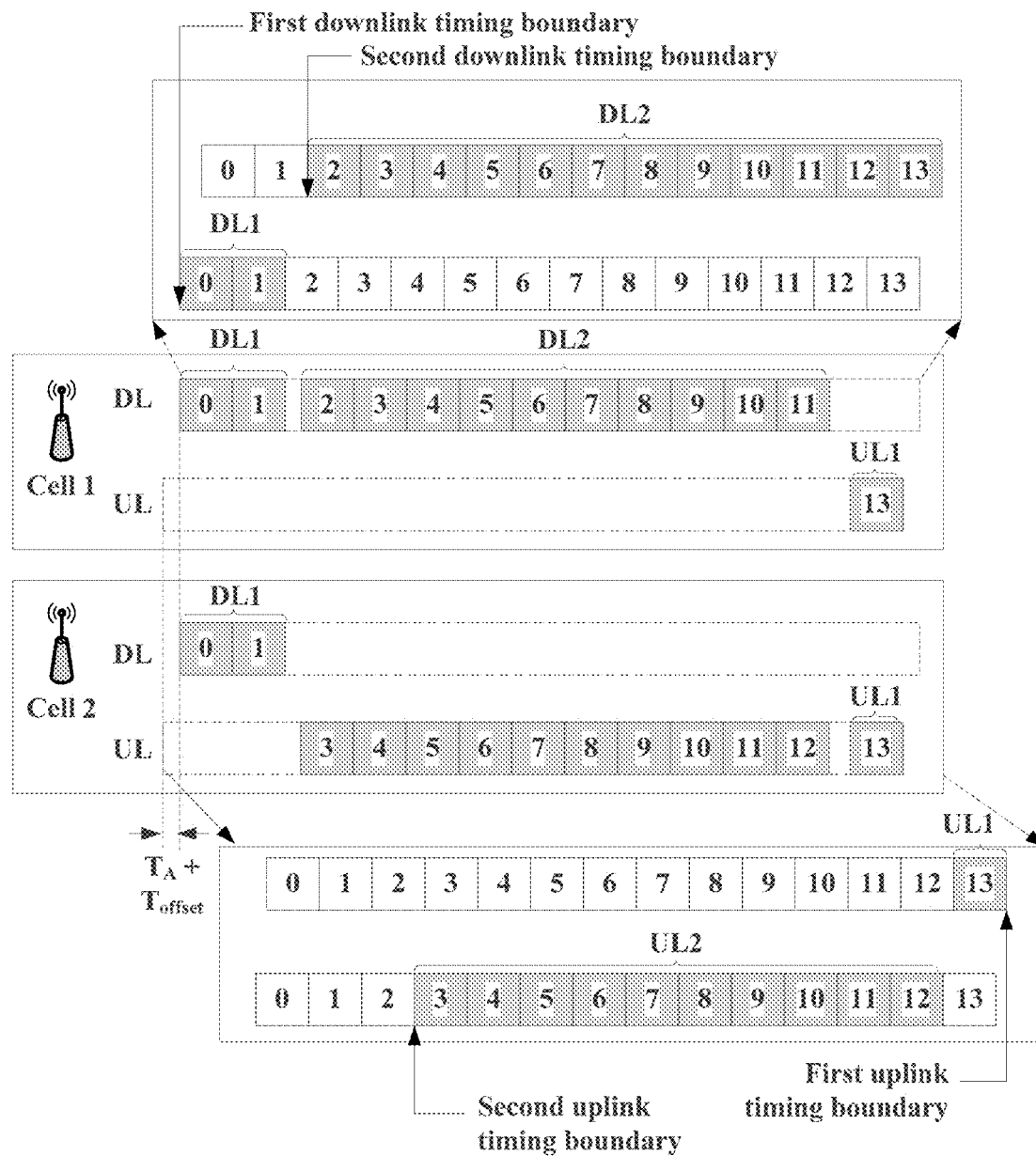
Figure 2:
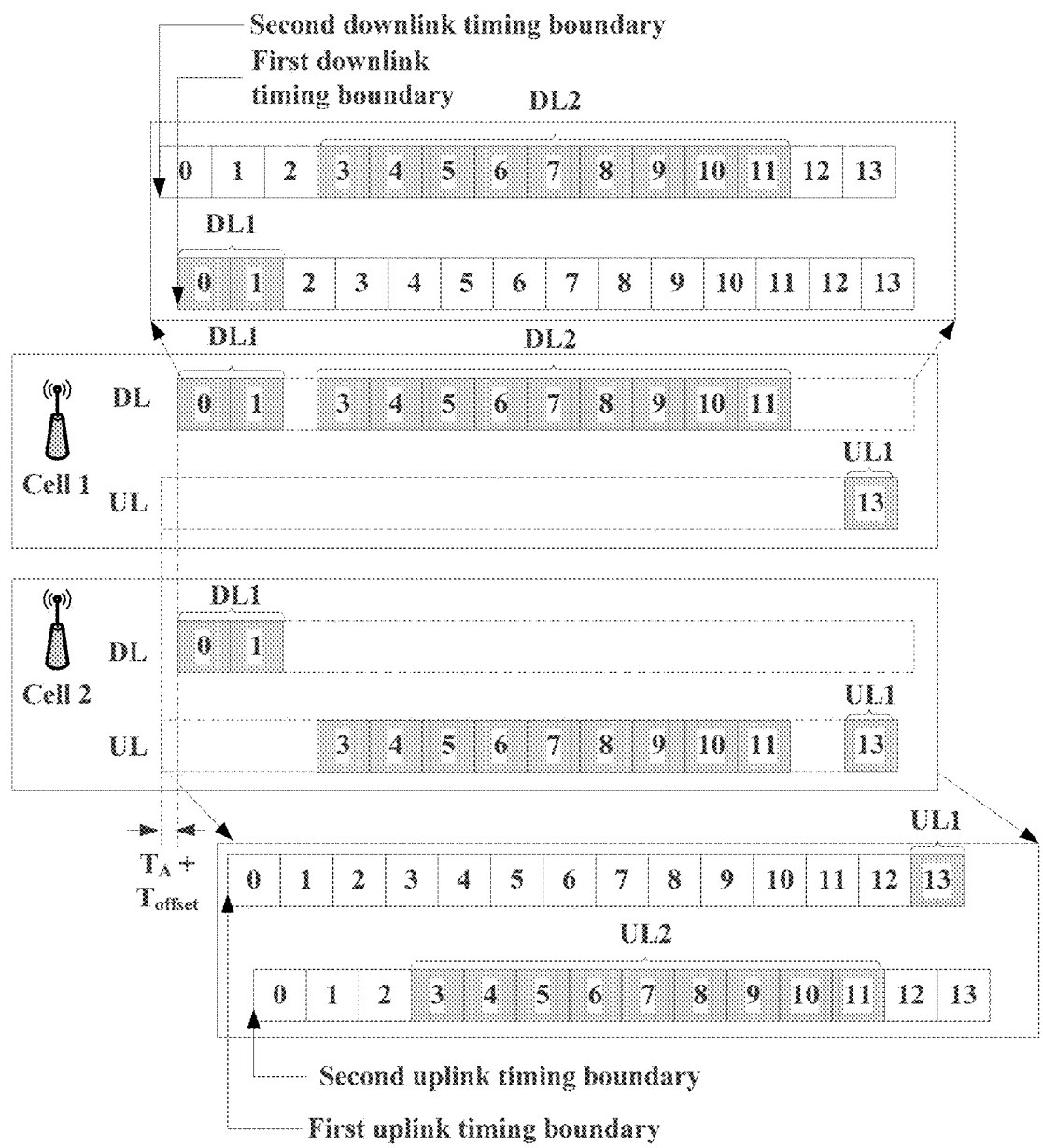
Figures 2, 3:
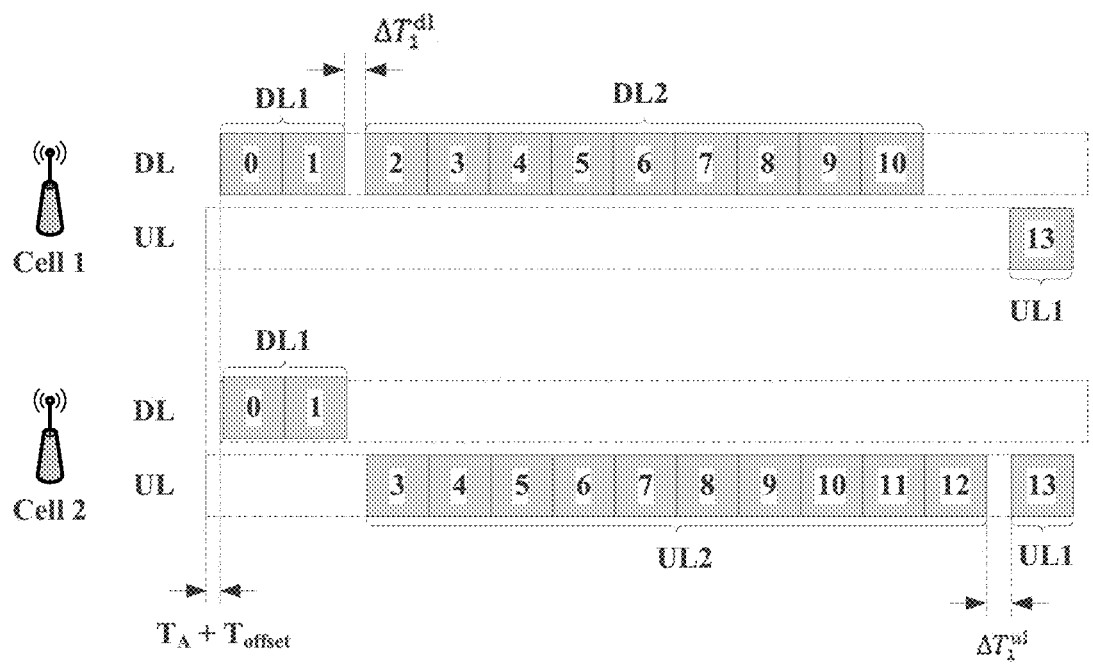

As shown in FIG. 2-3, that timing adjustment is performed on an existing downlink timing boundary is used as an example. A first downlink timing boundary is defined for DL1, and a second downlink timing boundary is defined for DL2. Because timing delay does not need to be defined for the DL1, when i=1, a downlink timing boundary of the DL1 is the defined first downlink timing boundary, and the first downlink timing boundary of the DL1 may be used as a reference for a downlink time domain region in another time segment. When timing delay needs to be defined for a downlink time domain region, the following may be defined: the downlink time domain region for which the timing delay is to be defined is delayed by one duration relative to the first downlink timing boundary. In FIG. 2, a second downlink timing boundary is delayed by $T_2^{dl}$ relative to the first downlink timing boundary. By analogy, a third downlink timing boundary of DL3 is also later than the first downlink timing boundary by one duration. Certainly, a time domain unit structure shown in FIG. 2-1 may alternatively be considered as a time domain unit structure having new defined downlink timing boundaries, and a timing relationship between the downlink timing boundaries and the first downlink timing boundary is similar.

When timing advancement is defined for receive timing of the downlink time domain region relative to the first downlink timing boundary, a timing rule B may be defined: a timing boundary of a $j^{th}$ downlink time domain region in the downlink time domain unit is earlier than the first downlink timing boundary, where j is a positive integer greater than 1 and less than or equal to $N_1$. That the downlink timing boundary of the $j^{th}$ downlink region is earlier than the first downlink timing boundary means that at least one downlink timing boundary other than the first downlink timing boundary in the downlink time domain unit may be defined to be earlier than the first downlink timing boundary. A specific timing quantity of downlink timing boundaries defined to be earlier than the first downlink timing boundary is not limited in this embodiment of the present invention.

For example, in FIG. 2-2, a downlink time domain region for which timing advancement is to be defined is advanced by one duration relative to the first downlink timing boundary.

According to the timing rule A, receive timing of the $i^{th}$ downlink time domain region is delayed at a network side receive end of a cell 1, to compensate for misalignment between the receive timing of the $i^{th}$ downlink time domain region and receive timing of an uplink time domain region at the network side receive end of a cell 2 adjacent to the cell 1.

It may be understood that timing is defined for a downlink timing boundary of at least one downlink region in the downlink time domain unit relative to the first downlink timing boundary, and for details about duration that needs to be configured and by which a downlink timing boundary of each downlink region is advanced or delayed, refer to composition structures of a downlink time domain unit and an uplink time domain unit in a cell. Alternatively, selective timing delay is defined based on factors such as uplink-downlink interference statuses of a cell, a cell level (a higher level indicates a higher defined timing delay criterion), or user density in a specific cell. For a definition of timing delay for at least one uplink timing boundary in the uplink time domain unit, refer to these factors. Details are not described subsequently. In addition, an application scenario in this embodiment of the present invention is not limited in this embodiment of the present invention.

In another implementation mechanism, timing is defined for the uplink time domain region.

Only transmit timing of the uplink time domain region in the uplink time domain unit may be redefined. For example, timing advancement or timing delay may be defined for the transmit timing of the uplink time domain region relative to a first downlink timing boundary. This can reduce symbol misalignment to some extent.

To cancel interference, timing advancement or timing delay may be defined for transmit timing of the uplink time domain unit relative to the first downlink timing boundary in a transmission pattern. When advancement is defined for transmit timing of each uplink time domain region relative to the first downlink timing boundary, a timing rule C may be defined: a timing boundary of a $k^{th}$ uplink time domain region in the uplink time domain unit is earlier than the first downlink timing boundary, where k is a positive integer greater than or equal to 1.

As shown in FIG. 2-1, a first uplink timing boundary is defined for UL1, and a second uplink timing boundary is defined for UL2. The first downlink timing boundary of DL1 may be used as a reference for the entire uplink time domain region. When timing advancement needs to be defined for an uplink time domain region, the following may be defined: the uplink time domain region for which the timing advancement is to be defined is delayed by one duration relative to the first downlink timing boundary. For example, the second uplink timing boundary in FIG. 2-1 is advanced by $T_2^{ul}$ relative to the first downlink timing boundary. Timing of another uplink time domain region may be defined in a similar manner. Details are not described again.

When timing delay is defined for the transmit timing of the uplink time domain region relative to the first downlink timing boundary, a timing rule D may be defined: a timing boundary of an $m^{th}$ uplink time domain region in the uplink time domain unit is later than the first downlink timing boundary, where m is a positive integer greater than 1. It should be noted that the first uplink timing boundary in the uplink time domain unit is always advanced relative to the first downlink timing boundary. A specific time domain unit structure after the timing delay is shown in FIG. 2-2.

According to the timing rule C or the timing rule D, receive timing of the $k^{th}$ uplink time domain region is delayed at a network side receive end of a cell 1, to compensate for misalignment between the receive timing of the $k^{th}$ uplink time domain region and the receive timing of the downlink time domain region at the network side receive end of a cell 2.

It can be learned that the foregoing four implementation mechanisms (the timing rule A to the timing rule D) can reduce symbol misalignment to some extent. To achieve a better symbol alignment effect, the timing rule A and the timing rule C, the timing rule A and the timing rule D, the timing rule B and the timing rule C, or the timing rule B and the timing rule D may be further combined. Duration by which the downlink timing boundary of each downlink time domain region is delayed or advanced relative to the first downlink timing boundary is not limited in this embodiment of the present invention.

In some inventive embodiments, in an implementation mechanism in which timing is defined for an uplink time domain region, transmit timing of each uplink time domain region in an uplink time domain unit may be defined, and is specifically defined as follows:

Assuming that an uplink time domain unit includes a first uplink time domain region, a second uplink time domain region, and a third uplink time domain region. The first to the third uplink time domain regions include symbols such as orthogonal frequency division multiplexing (English full name: Orthogonal Frequency Division Multiplexing, OFDM for short) symbols. Some symbols are used to transmit control signaling, and some symbols are used to transmit data. Therefore, the first to the third uplink time domain regions may include an uplink control region for transmitting control signaling and/or an uplink data region for transmitting data. The uplink data region is an actual effective transmission region, and is referred to as a transmission region below.

First, a timing definition for the first to the third uplink timing boundaries is specifically as follows:

1. For example, when k=1, timing is defined for a first uplink timing boundary.

The first uplink timing boundary is an uplink timing boundary of the first uplink time domain region, and the first uplink timing boundary is earlier than the first downlink timing boundary by duration $\Delta_1^{ul}=T_A+T_{offset,1}$, where $T_A$ is a specific parameter of a terminal device configured at a network side, and $T_{offset,1}$ is a predefined fixed value.

2. When k=2, timing is defined for a second uplink timing boundary.

The second uplink timing boundary is an uplink timing boundary of the second uplink time domain region, and the second uplink time domain region includes a symbol transmitted based on the second uplink timing boundary. The second uplink timing boundary is earlier than the first downlink timing boundary by duration $T_2^{ul}=T_1^{ul}+\Delta T_1^{ul}$, where $T_1^{ul}$ is duration by which a first uplink timing boundary is earlier than the first downlink timing boundary. $\Delta T_1^{ul}$ is an offset between the uplink timing boundary of the second uplink time domain region and the first uplink timing boundary.

A value range of $\Delta_1^{ul}$ is mainly defined in the following two manners A1 and B1.

Manner A1: $\Delta_1^{ul}$ may be a predefined first fixed value.

For example, by setting the first fixed value, it can be ensured that a second downlink time domain region (DL2 in a cell 1 shown in FIG. 2-3) and the second uplink time domain region (UL2 in a cell 2 shown in FIG. 2-3) have a same receiving start moment at a network side of the cell 2, or it can be ensured that a second downlink time domain region (DL2 in a cell 1 shown in FIG. 2-4) and the second uplink time domain region (UL2 in a cell 2 shown in FIG. 2-4) have a same receiving end moment at a network side of the cell 2. A symbol corresponding to the DL2 in the cell 1 can be aligned in time domain with a symbol corresponding to the UL2 in the cell 2 at a receive timing moment at the network side of the cell 2 based on the foregoing timing configuration. In other words, the DL2 in the cell 1 and the UL2 in the cell 2 can reach the network side at the same time. It may be understood that the first fixed value is preset, but a value of the first fixed value may change flexibly, and may be not limited to a same first fixed value used in all scenarios.

Manner B1: $\Delta_1^{ul}$ is any value in a predefined first set. In addition, when a communications device sends a signal based on the second uplink timing boundary, a quantity of elements in the first set is related to a quantity of symbols included in the second uplink time domain region. For example, symbols are sent based on the uplink timing boundary of the second uplink time domain region UL2, and the symbols of the UL2 are 3 to 11. The quantity of elements in the first set may be determined based on a total of nine symbols of the UL2. Similarities are not described below again.

For example, a value range of a quantity of symbols effectively transmitted in the UL2 may be set to 1 to 10, and a relationship between a value range of an element included in the first set and the quantity of symbols included in the UL2 is as follows:

When the quantity of symbols included in the UL2 is 10 (for example, 3 to 12), the quantity of elements included in the first set may be 1, and the value range of the first set is $\{\Delta_1^{ul,min}\}$ where $\Delta T_1^{ul,min}$ indicates a minimum transmit timing offset of the second uplink time domain region.

When symbols included in the UL2 are 3 to 11, the first set is $\{\Delta_1^{ul,min}, \Delta T_1^{ul,min}+T_{symbol}\}$ where $T_{symbol}$ is a length occupied by a symbol in time domain.

. . .

When a symbol included in the UL2 is 2, the first set is $\{\Delta_1^{ul,min}, \Delta T_1^{ul,min}+T_{symbol}, \ldots, \Delta_1^{ul,min}+9T_{symbol}\}$.

Figures 2, 3, 4:
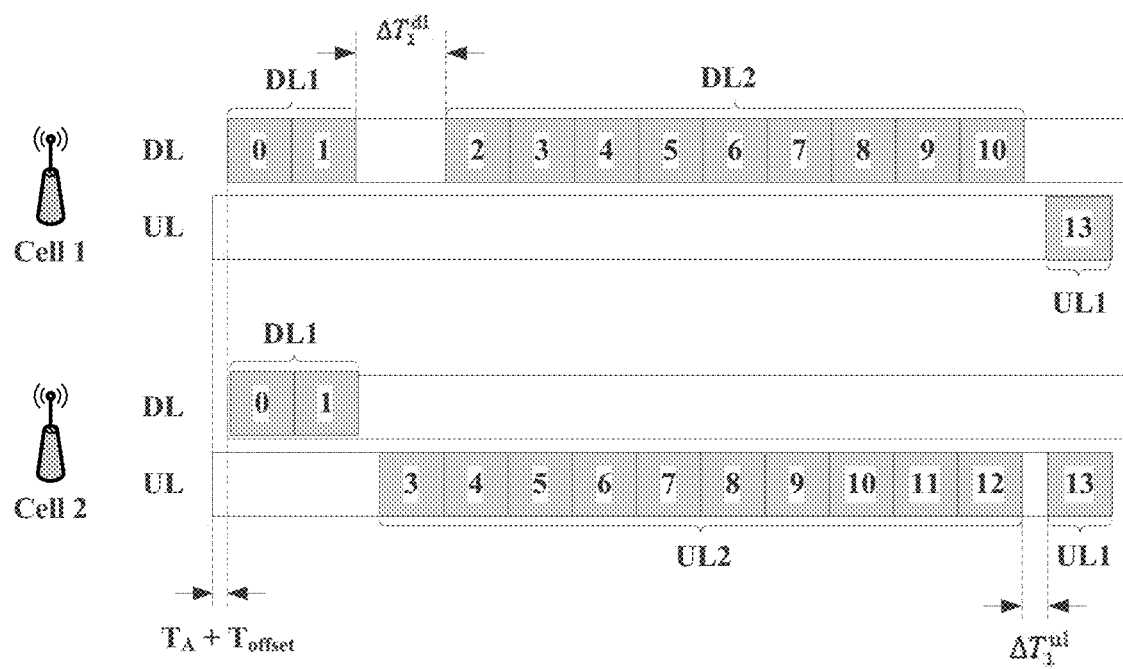
Figure 3:
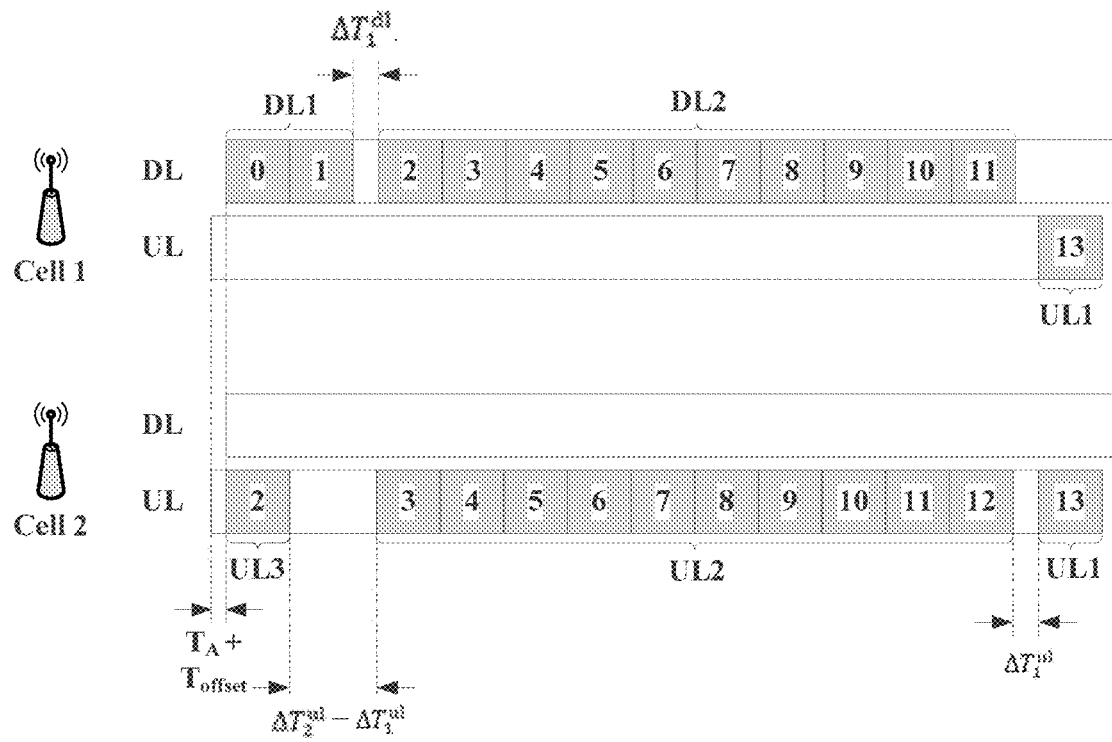
Figure 4:
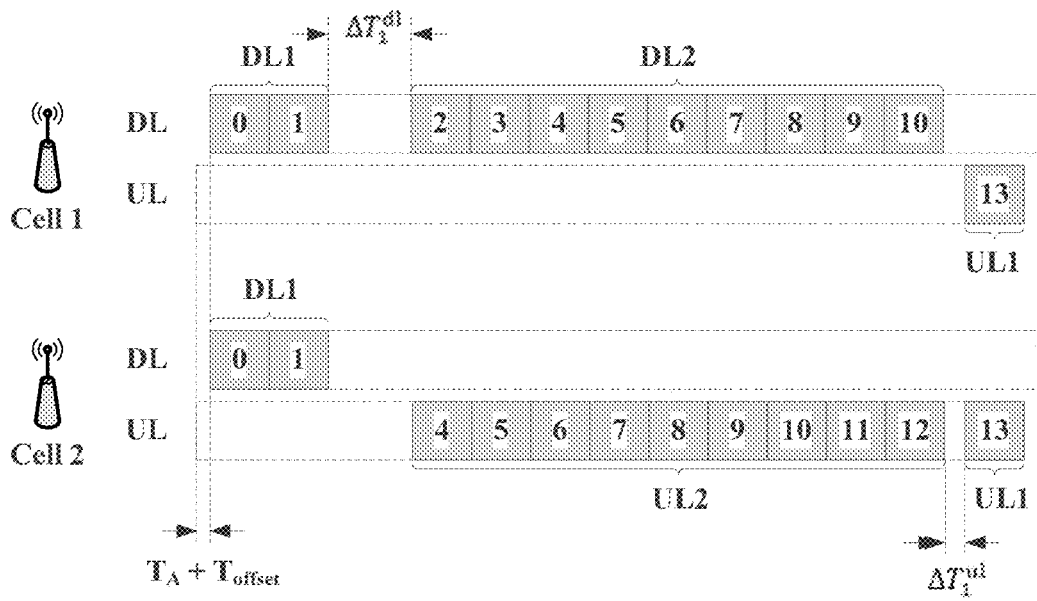

Assuming that actually transmitted symbols used for data transmission in the UL2 in the cell 2 include 3 to 12, and a quantity of actually transmitted symbols is 7, a value of $\Delta_1^{ul}$ may be $\Delta_1^{ul,min}$ (as shown in FIG. 2-3) or $\Delta T_1^{ul,min}+T_{symbol}$ (as shown in FIG. 2-4). The value range of the first set may be selected based on a factor such as a service class, a degree of interference, or user density, or may be selected by narrowing the value range. A proper value range is preconfigured based on various scenarios, to achieve an expected purpose of reducing symbol interference while reducing operations of a terminal device and an access network device. A specific rule for configuring the value range is not limited in this embodiment of the present invention.

3. When k=3, timing advancement is defined for a third uplink timing boundary.

The third uplink timing boundary is an uplink timing boundary of the third uplink time domain region in the uplink time domain unit, and the third uplink time domain region includes a symbol transmitted based on the third uplink timing boundary. The third uplink timing boundary is earlier than the first downlink timing boundary by duration $T_3^{ul}=T_1^{ul}+\Delta T_2^{ul}$.

$\Delta T_2^{ul}$ is an offset of the third uplink timing boundary relative to a first uplink timing boundary. A value range of $\Delta T_2^{ul}$ is mainly defined in the following two manners A2 and B2.

Manner A2: $\Delta T_2^{ul}$ may be a predefined second fixed value.

For example, the second fixed value is set, to ensure that a first downlink time domain region (DL1 in a cell 2 shown in FIG. 3) and the third uplink time domain region (UL3 in a cell 1 shown in FIG. 3) have a same receiving start moment at a network side receive end of the cell 2. Symbols are aligned at the start moment based on the configuration, so that interference can be reduced. In addition, the second fixed value is preset, but a value of the second fixed value may change flexibly, and may be not limited to a same second fixed value used in all scenarios.

Manner B2: $\Delta T_2^{ul}$ is any value in a predefined second set. Likewise, when a communications device sends a signal based on the third uplink timing boundary, a quantity of elements in the second set is related to a quantity of symbols included in the third uplink time domain region.

A relationship between a value range of an element included in the second set and the quantity of symbols included in the second uplink time domain region is as follows:

For example, as shown in FIG. 3, a range of a quantity of actually transmitted symbols in the third uplink time domain region UL3 may be set to 1 to 2. When the quantity of actually transmitted symbols in the UL3 is 1, the second set is $\{\Delta T_2^{ul,min}, \Delta T_2^{ul,min}+T_{symbol}\}$, where $\Delta T_2^{ul,min}$ indicates a minimum transmit timing offset of the third uplink time domain region.

When symbols 1 and 2 are actually transmitted, a value of $\Delta T_2^{ul}$ is $\Delta T_2^{ul,min}$, a symbol 2 of the cell 2 is aligned with a symbol 1 of the cell 1 at the network side receive end of the cell 2, and a symbol 1 of the cell 2 is aligned with a symbol 0 of the cell 1 at the network side receive end of the cell 2. Alternatively, when a symbol 2 is actually transmitted, a value of $\Delta T_2^{ul}$ is $\Delta T_2^{ul,min}+T_{symbol}$, and the symbol 2 of the cell 2 is aligned with a symbol 0 of the cell 1 at the network side receive end of the cell 2.

Optionally, when timing advancement is defined for an uplink timing boundary in the uplink time domain unit, timing advancement or timing delay may be further defined for a downlink timing boundary in a downlink time domain unit.

Second, other timing definitions of the second and the third uplink timing boundaries are specifically as follows:

1. For example, when m=2, timing delay is defined for a second uplink timing boundary.

The second uplink timing boundary is an uplink timing boundary of the second uplink time domain region, and the second uplink time domain region includes a symbol transmitted based on the second uplink timing boundary. The second uplink timing boundary is later than the first downlink timing boundary by duration $T_2^{ul'}=\Delta T_1^{ul'}$, where $\Delta T_1^{ul'}$ is an offset between a first uplink timing boundary and the second uplink timing boundary.

When the timing delay is defined for the second uplink timing boundary, $\Delta_1^{ul'}$ is a predefined fifth fixed value or any value in a predefined fifth set. When a symbol is sent based on the second uplink timing boundary, a quantity of elements in the fifth set is related to a quantity of symbols included in the second uplink time domain region.

2. When m=3, timing delay is defined for a third uplink timing boundary.

The third uplink timing boundary is an uplink timing boundary of the third uplink time domain region, and the third uplink time domain region includes a symbol transmitted based on the third uplink timing boundary. The third uplink timing boundary is later than the first downlink timing boundary by duration $T_3^{ul'}=\Delta T_2^{ul'}$, where $\Delta T_2^{ul'}$ is an offset between a first uplink timing boundary and the third uplink timing boundary.

When the timing delay is defined for the third uplink timing boundary, $\Delta T_2^{ul'}$ is a predefined sixth fixed value or any value in a predefined sixth set. When a symbol is sent based on the third uplink timing boundary, a quantity of elements in the sixth set is related to a quantity of symbols included in the third uplink time domain region.

In addition, for descriptions about values of $\Delta T_1^{ul'}$ and $\Delta T_2^{ul'}$ in the timing delay definitions of the second and the third uplink timing boundaries, refer to the timing advancement definitions of the second and the third uplink timing boundaries. Details are not described herein again.

Figures 1, 7:
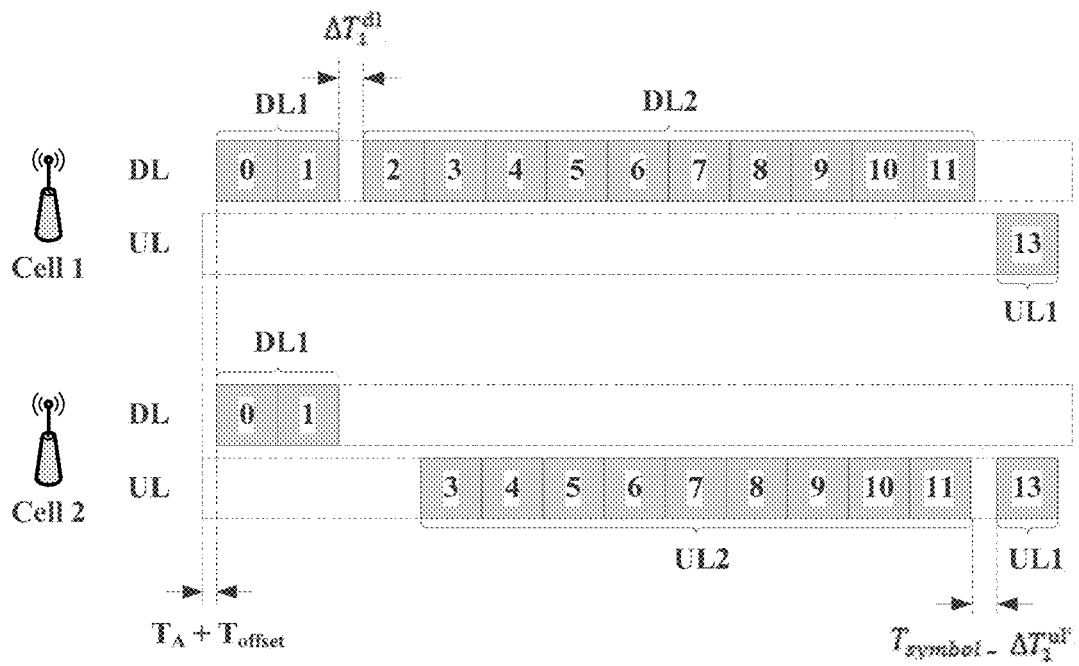
Figures 2, 7:
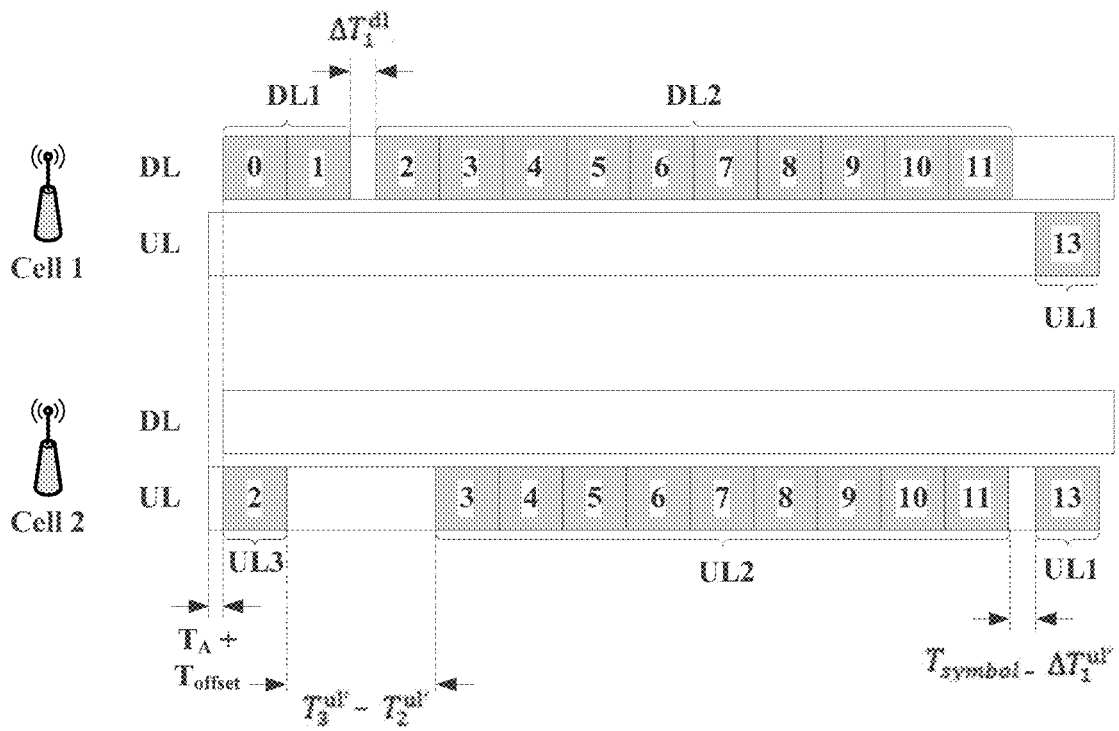
Figures 3, 7:
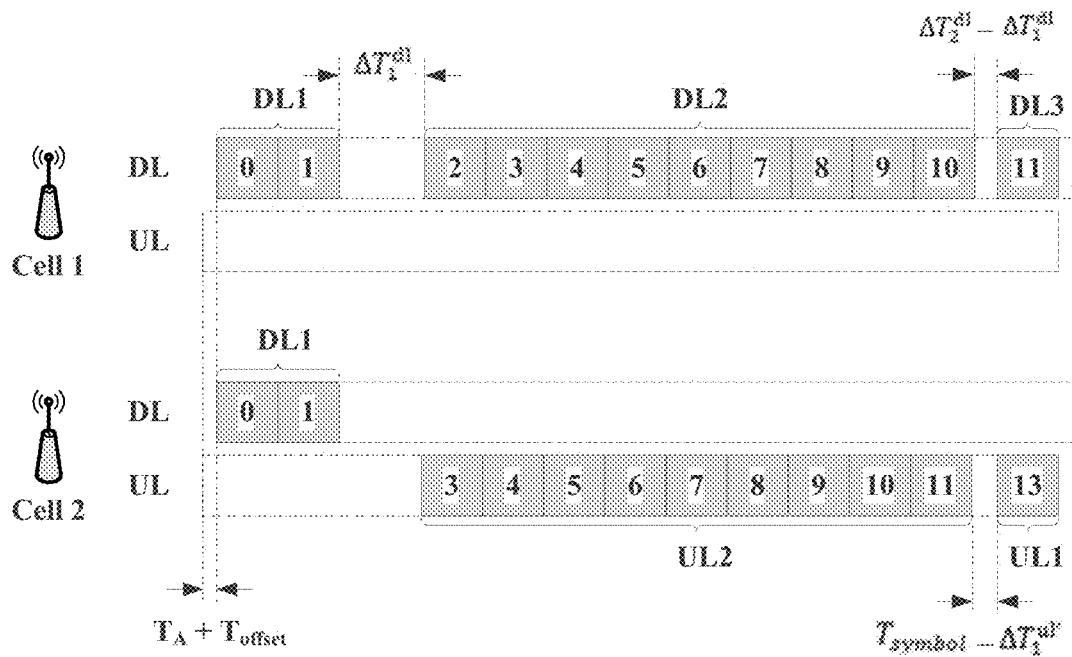
Figures 4, 7:
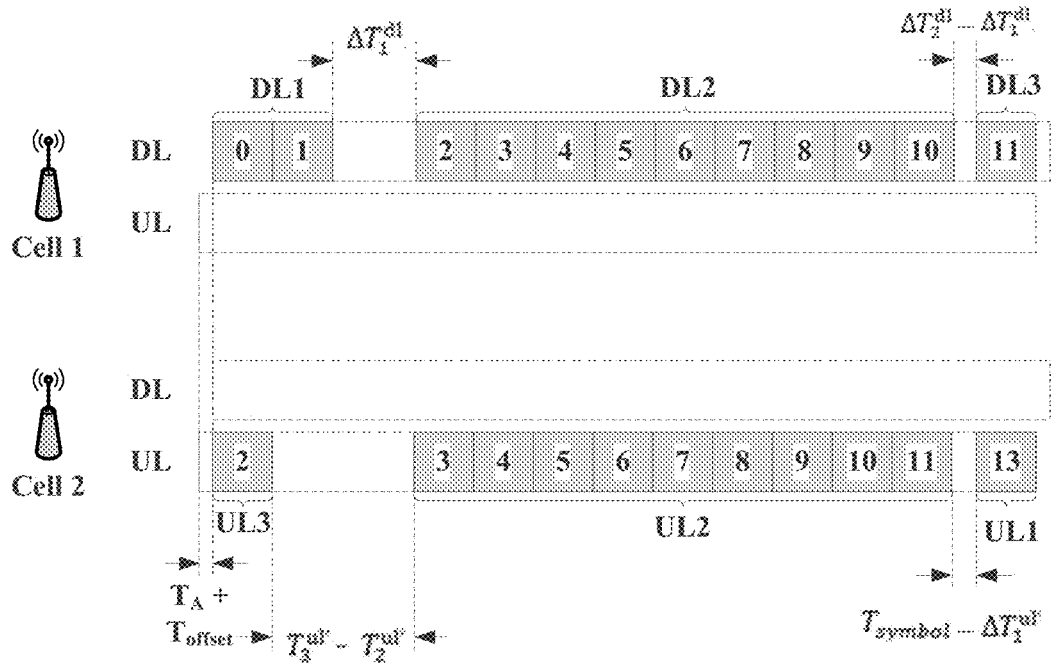

Optionally, when timing delay is defined for an uplink timing boundary in the uplink time domain unit, timing advancement or timing delay may be further defined for a downlink timing boundary in a downlink time domain unit. For example, as shown in FIG. 7-1, a second uplink timing boundary of UL2 in a cell 2 is delayed relative to a first downlink timing boundary, and a second downlink timing boundary of DL2 is delayed relative to the first downlink timing boundary, so that symbols 3 to 11 in the DL2 are aligned with symbols 3 to 11 in the cell 2 at a network side receive end of the cell 2. For other time domain structures after timing delay is defined for three time domain unit structures in FIG. 7-2 to FIG. 7-4, respectively, refer to descriptions in FIG. 7-1, and details are not described herein.

In some inventive embodiments, in an implementation mechanism in which timing is defined for a downlink time domain region, receive timing of each downlink time domain region in a downlink time domain unit may be defined, and is specifically defined as follows.

Assuming that a downlink time domain unit includes a first downlink time domain region, a second downlink time domain region, and a third downlink time domain region. The first to the third downlink time domain regions include symbols such as OFDM symbols. Some symbols are used to transmit control signaling, and some symbols are used to transmit data. Therefore, the first to the third downlink time domain regions may include a downlink control region for transmitting control signaling and/or a downlink data region for transmitting data. The downlink data region is an actual effective transmission region, and is referred to as a downlink time domain region below.

First, timing definitions of the first to the third downlink timing boundaries in the downlink time domain unit are specifically as follows:

1. When i=1, timing is defined for a first downlink timing boundary.

A downlink timing boundary of the first downlink time domain region is later than the first downlink timing boundary by duration $T_1^{dl}$, $T_1^{dl}=0$. Actually, the downlink timing boundary of the first downlink time domain region is not adjusted. An index number of a symbol included in the first downlink time domain region starts from 0.

2. When i=2, timing delay is defined for a second downlink timing boundary.

The second downlink timing boundary is a downlink timing boundary of the second downlink time domain region, and the second downlink time domain region includes a symbol transmitted based on the second downlink timing boundary. The second downlink timing boundary is later than the first downlink timing boundary by duration $T_2^{dl}$, $T_2^{dl}=\Delta T_1^{dl}$. $\Delta T_1^{dl}$ is an offset of the second downlink timing boundary relative to the first downlink timing boundary. A value range of $\Delta_1^{dl}$ is mainly defined in the following two manners C1 and C2.

Manner C1: $\Delta T_1^{dl}$ is a predefined third fixed value.

For example, by setting the third fixed value, it can be ensured that a second uplink time domain region (UL2 in a cell 2 shown in FIG. 2-3) and the second downlink time domain region (DL2 in a cell 1 shown in FIG. 2-3) have a same receiving start moment at a network side receive end of the cell 2, or it can be ensured that a second uplink time domain region (UL2 in a cell 2 shown in FIG. 2-4) and the second downlink time domain region (DL2 in a cell 1 shown in FIG. 2-4) have a same receiving end moment at a network side receive end of the cell 2. Symbols are aligned at the start moment based on the configuration, so that most symbols in UL1 in the cell 2 and in DL3 in the cell 1 are aligned in a same subframe. The third fixed value is preset, but a value of the third fixed value may change flexibly, and may be not limited to a same third fixed value used in all scenarios.

In addition, if the manner C1 is used to define the timing delay of the second downlink time domain region, the manner A1 may be combined for use to define timing advancement of the second uplink time domain region. If both the manner A1 and the manner C1 are used, both may use compromised fixed values. An index table may be preconfigured for the used compromised fixed values, and the index table may include uplink timing advancement duration and downlink timing delay duration, and may further include a symbol quantity index range. For example, when a quantity of symbols included in an uplink time domain region or a downlink time domain region falls within a preset symbol quantity index range, two fixed values (including transmit timing delay duration of the uplink time domain region and/or receive timing delay duration of the downlink time domain region) corresponding to the index range may be directly used. It should be noted that, for a definition of transmit timing advancement duration of another uplink time domain region and a definition of receive timing delay duration of another downlink time domain region, refer to descriptions herein. Details are not described.

Manner D1: $\Delta T_1^{dl}$ is any value in a predefined third set.

A quantity of elements in the third set is related to a quantity of symbols included in the second downlink time domain region.

Figures 1, 5:
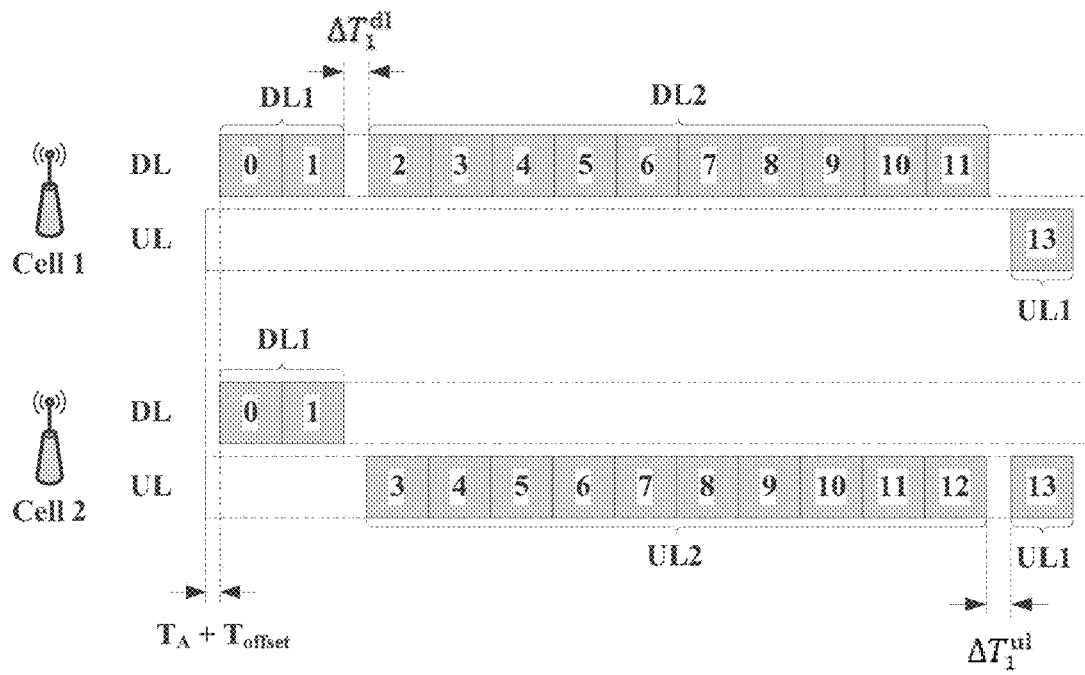
Figures 2, 5:
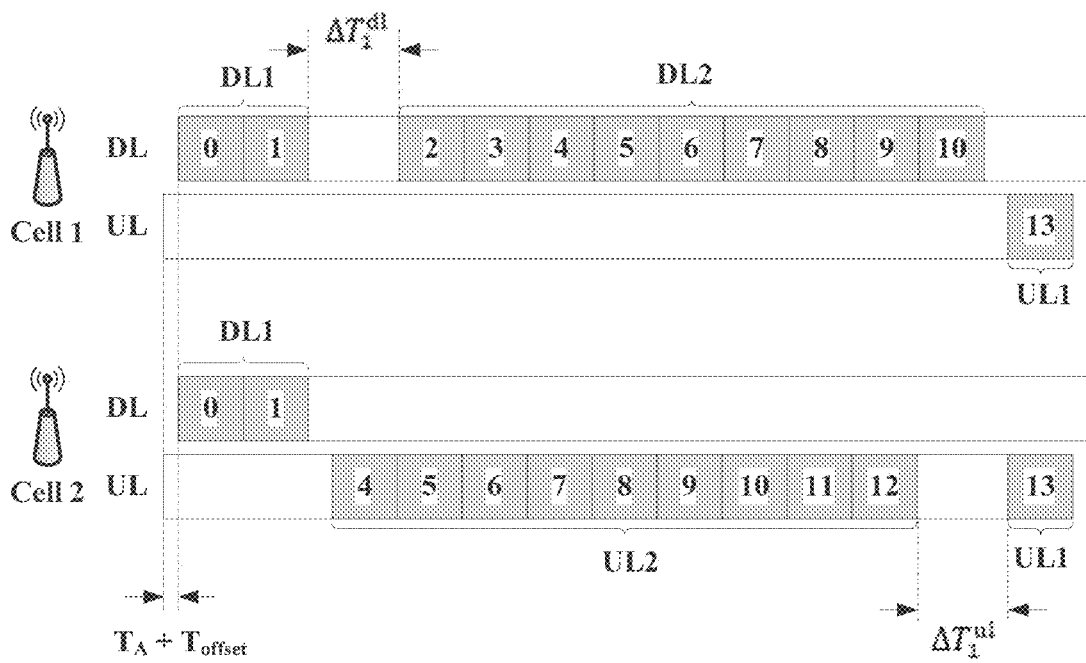
Figures 3, 5:
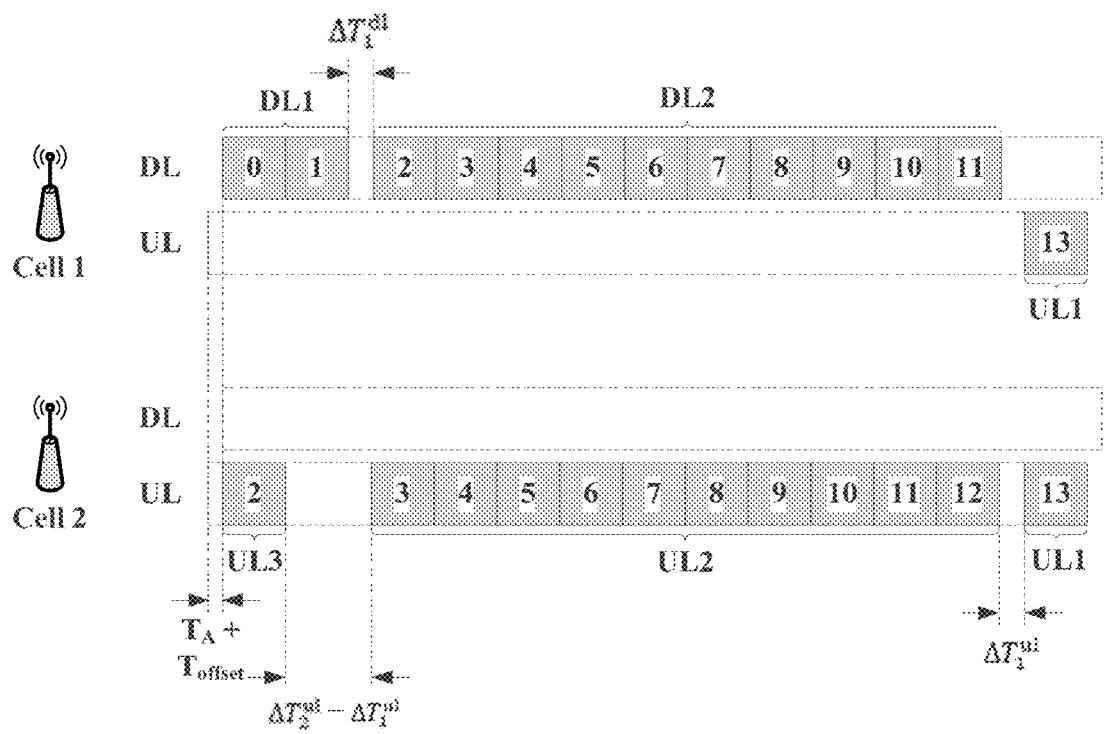
Figures 4, 5:
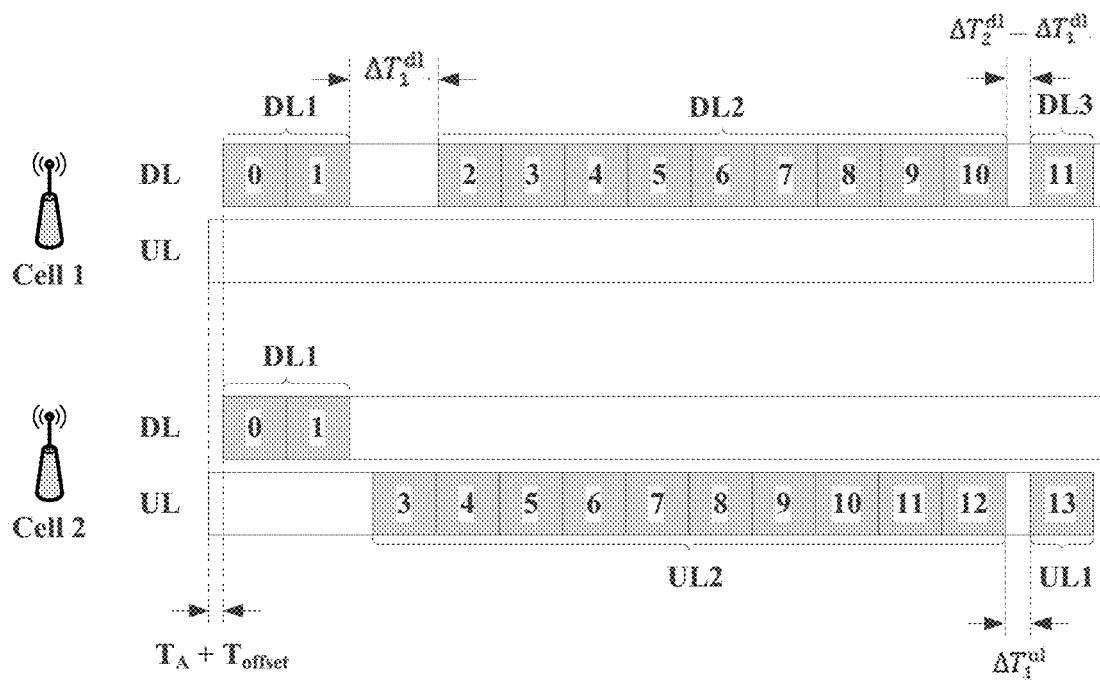
Figure 5:
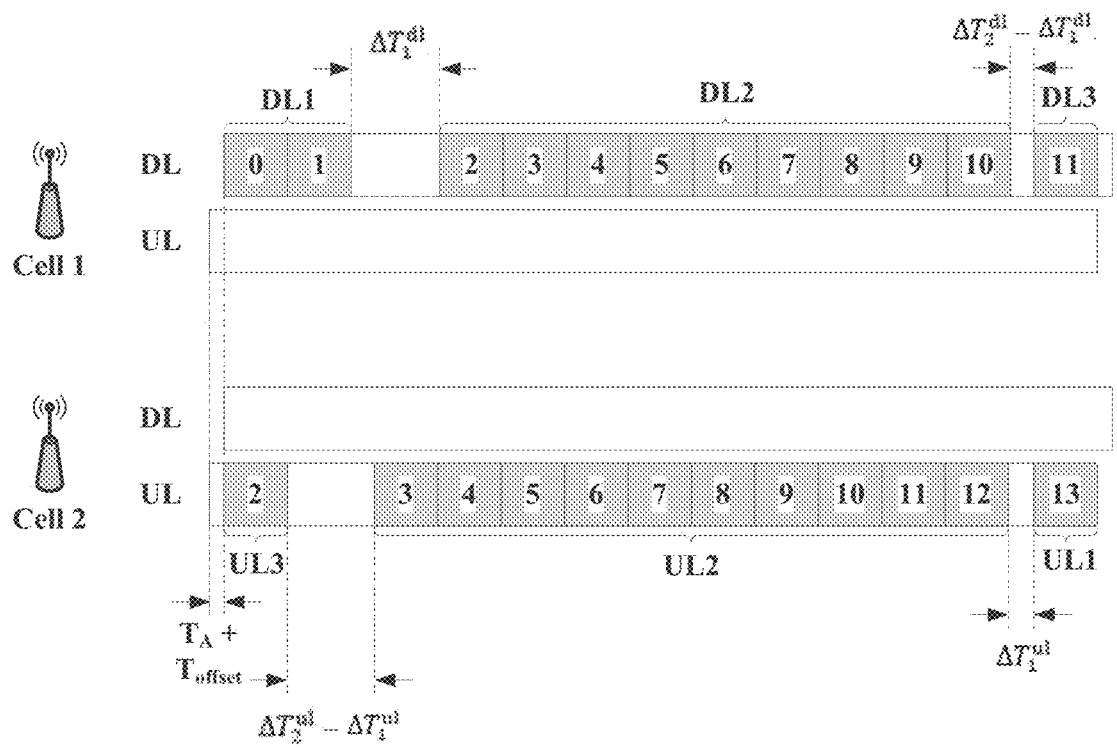

For example, when a quantity of symbols actually transmitted in the second downlink time domain region (DL2 in a cell 1) is 9 (including symbols 2 to 10), and a quantity of elements included in the third set may be 2, a value range of the third set is $\{\Delta T_1^{dl,min}, \Delta T_1^{dl,min}+T_{symbol}\}$. When $\Delta T_1$ is $\Delta T_1^{dl,min}$, a time domain unit structure is shown in FIG. 2-3. When $\Delta T_1$ is $\Delta T_1$ is $\Delta T_1^{dl,min}+T_{symbol}$, a time domain unit structure is shown in FIG. 5-4.

3. When i=3, timing delay is defined for a third downlink timing boundary.

The third downlink timing boundary is a downlink timing boundary of the third downlink time domain region, and the third downlink time domain region includes a symbol transmitted based on the third downlink timing boundary. The third downlink timing boundary is later than the first downlink timing boundary by duration $T_3^{dl}$, $T_3^{dl}=\Delta T_2^{dl}$, where $\Delta T_2^{dl}$ is an offset between the third downlink timing boundary and the first downlink timing boundary. A value range of $\Delta T_2^{dl}$ is mainly defined in the following two manners C2 and D2.

Manner C2: $\Delta T_2^{dl}$ is a predefined fourth fixed value.

For example, it can be ensured, by setting the fourth fixed value, that a first uplink time domain region (UL1 in a cell 2 shown in FIG. 5-4) is the same as the third downlink time domain region (DL3 in a cell 1 shown in FIG. 5-4) at a network side receive end of the cell 2. A start moment is configured, so that symbols in the UL1 in the cell 2 and in DL3 in the cell 1 are aligned at the network side receive end of the cell 2.

Manner D2: $\Delta T_2^{dl}$ is any value in a predefined fourth set.

Optionally, when a communications device receives a transmitted signal based on the third downlink timing boundary, a quantity of elements in the fourth set is related to a quantity of symbols included in the third downlink time domain region.

If timing delay is defined for both the second downlink timing boundary and the third downlink timing boundary, a relative delay offset, that is, $\Delta T_2^{dl}-\Delta T_1^{dl}$, is formed between the second downlink time domain region and the third downlink time domain region. As shown in FIG. 5-4, DL2 in the cell 1 and UL2 in the cell 2 have a same receiving end moment at the network side of the cell 2, so that the DL3 in the cell 1 and the UL1 in the cell 2 have the same receiving start moment and a same receiving end moment at the network side of the cell 2.

When timing delay is defined for each downlink timing boundary in the downlink time domain unit relative to the first downlink timing boundary, timing advancement or timing delay may be further defined for an uplink timing boundary in an uplink time domain unit relative to the first downlink timing boundary. For example, as shown in FIG. 4, downlink timing boundaries of DL2 and DL3 are delayed relative to a downlink timing boundary of DL1, and uplink timing boundaries of UL2 and UL3 are advanced. In this way, symbols 2 to 10 in the DL2 are aligned with symbols 4 to 12 in the UL2 at a network side receive end of a cell 2.

Second, other timing definitions of the second and the third downlink timing boundaries are specifically as follows:

1. For example, when j=2, timing is defined for a second downlink timing boundary.

The second downlink timing boundary is a downlink timing boundary of the second downlink time domain region, and the second downlink timing boundary is earlier than the first downlink timing boundary by duration $T_2^{dl'}$, $T_2^{dl'}=\Delta T_1^{dl'}$, where $\Delta T_1^{dl'}$ is an offset between the second downlink timing boundary and the first downlink timing boundary.

When timing advancement is defined for the second downlink time domain region, $\Delta T_1^{dl'}$ is a predefined seventh fixed value or any value in a predefined seventh set. When a symbol is received based on the second downlink timing boundary, a quantity of elements in the seventh set is related to a quantity of symbols included in the second downlink time domain region.

2. When j=3, timing advancement is defined for a third downlink timing boundary.

The third downlink timing boundary is a downlink timing boundary of the third downlink time domain region, and the third downlink timing boundary is earlier than the first downlink timing boundary by duration $T_3^{dl'}$, $T_3^{dl'}=T_2^{dl'}$, where $\Delta T_2^{dl'}$ is an offset between the third downlink timing boundary and the first downlink timing boundary.

When the timing advancement is defined for the third downlink timing boundary, $\Delta T_2^{dl'}$ is a predefined eighth fixed value or any value in a predefined eighth set. When a communications device receives a symbol based on the third downlink timing boundary, a quantity of elements in the eighth set is related to a quantity of symbols actually received by the communications device.

In addition, for descriptions about values of $\Delta T_1^{dl'}$ and $\Delta T_2^{dl'}$ in the timing delay definitions of the second and the third downlink timing boundaries relative to the first downlink timing boundary, refer to the timing delay definitions of the second and the third downlink timing boundaries. Details are not described herein again.

Figures 1, 8:
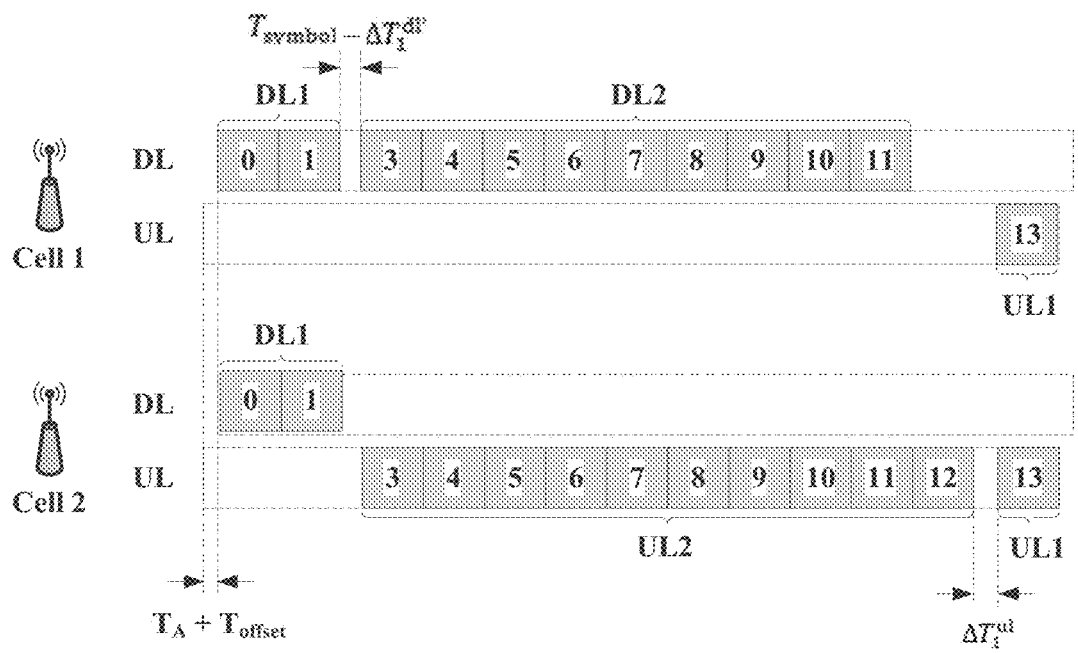
Figures 2, 8:
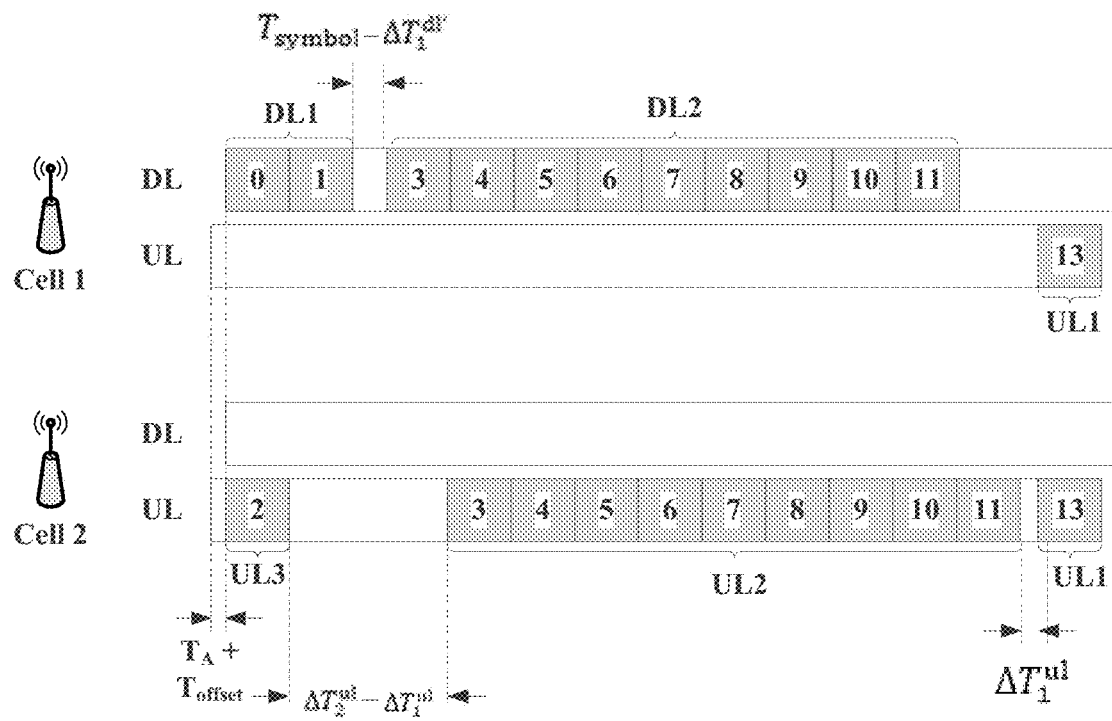

When timing advancement is defined for a downlink timing boundary in the downlink time domain unit relative to the first downlink timing boundary, timing advancement or timing delay may be further defined for an uplink timing boundary in an uplink time domain unit relative to the first downlink timing boundary. For example, as shown in FIG. 8-1, downlink timing boundaries of DL2 and DL3 are advanced, and uplink timing boundaries of UL2 and UL3 are advanced. In this way, symbols 3 to 11 in the DL2 are aligned with symbols 3 to 11 in the UL2 at a network side receive end of a cell 2.

For another example, as shown in FIG. 8-2, downlink timing boundaries of DL2 and DL3 are advanced, and uplink timing boundaries of UL2 and UL3 are delayed relative to a downlink timing boundary of DL1. In this way, symbols 4 to 11 in the DL2 are aligned with symbols 3 to 10 in the UL2 at a network side receive end of a cell 2.

Optionally, in some inventive embodiments, if a time domain unit includes only a downlink time domain region, and delay is defined for receive timing of both a second downlink time domain region and a third downlink time domain region relative to a first downlink timing boundary, a relative delay offset, that is, $\Delta T_1^{dl}$, is formed between a first downlink time domain region and the second downlink time domain region, and a relative delay offset, that is, $\Delta T_2^{dl} - \Delta T_1^{dl}$, is formed between the second downlink time domain region and the third downlink time domain region.

If a time domain unit includes only an uplink time domain region, and advancement is defined for transmit timing of both a second uplink time domain region and a third uplink time domain region relative to the first downlink timing boundary, a relative delay offset, that is, $\Delta T_1^{ul}$, is formed between the second uplink time domain region and a first uplink time domain region, and a relative delay offset, that is, $\Delta T_2^{ul} - \Delta T_1^{ul}$, is formed between the third uplink time domain region and the second uplink time domain region.

It should be noted that, when timing advancement is defined for transmit timing of each uplink time domain region in the uplink time domain unit relative to the first downlink timing boundary, or timing delay is defined for receive timing of each downlink time domain region in the downlink time domain unit relative to the first downlink timing boundary, there is only a need to align, in time domain, a symbol actually transmitted in an uplink time domain region with a symbol actually transmitted in a corresponding downlink time domain region that is prone to interference, and it is not necessarily to align all symbols in the uplink time domain region with all symbols in the downlink time domain region in time domain. For example, as shown in FIG. 5-2, UL2 in an uplink time domain unit includes symbols 4 to 12, and DL2 in a downlink time domain unit includes symbols 2 to 10. There is only a need to advance transmit timing of the UL2 and to delay receive timing of the DL2. To some extent, the symbols 4 to 12 in the UL2 and the symbols 2 to 10 in the DL2 can be received at a receive end of a cell 2 at the same time. For example, after a sending start moment of a symbol 5 in the UL2 is advanced, the symbol 5 in the UL2 has the same receiving start moment as the symbol 2 in the DL2 at the network side receive end.

In addition, timing advancement or timing delay may be defined for at least one of the first uplink timing boundary, the second uplink timing boundary, or the third uplink timing boundary relative to the first downlink timing boundary, and timing delay or timing advancement may be defined for at least one of the second downlink timing boundary or the third downlink timing boundary relative to the first downlink timing boundary. This embodiment of the present invention is not limited to a scenario in which an uplink time domain unit includes three uplink timing boundaries, and is also not limited to a scenario in which a downlink time domain unit includes three downlink timing boundaries. Timing advancement may be defined for only an uplink timing boundary in the uplink time domain unit relative to the first downlink timing boundary, and timing delay may be defined for only a downlink timing boundary in the downlink time domain unit relative to the first downlink timing boundary. For example, timing delay is defined for only the DL2 and the DL3, and timing advancement is not defined for the UL1, the UL2, and the UL3. In this case, a region including the DL2 and the DL3 in the cell 1 can be aligned with the UL2 in the cell 2 at the network side receive end of the cell 2 in time domain by using timing. Optionally, another application scenario may be included, and specifically depends on a time domain unit structure. Details are not described in this embodiment of the present invention.

In actual application, timing may be separately defined for only the uplink timing boundary and the downlink timing boundary. Alternatively, there may be other timing combinations. For example, when the downlink timing boundary is defined to be later than the first downlink timing boundary, the uplink timing boundary may be further defined to be later than or earlier than the first downlink timing boundary; or when the downlink timing boundary is defined to be later than the first downlink timing boundary, the uplink timing boundary may be further defined to be later than or earlier than the first downlink timing boundary. In comparison with an existing mechanism, in this embodiment of the present invention, timing adjustment is performed on the existing uplink and/or downlink timing boundary, or a new uplink or downlink timing boundary or both are defined. The communications device transmits the signal by using the transmission pattern defined in this embodiment of the present invention, reducing symbol misalignment, and reducing interference caused by the symbol misalignment correspondingly. This facilitates cancellation of cross interference between communications devices. In addition, a timing definition combination manner that is specifically used is not limited in this embodiment of the present invention.

It should be noted that, in this embodiment of the present invention, the timing adjustment performed on the uplink timing boundary and/or the downlink timing boundary may be specifically set based on factors such as division of a time domain unit and a data transmission requirement. This is not limited in this embodiment of the present invention. For a timing definition of each data region or each control region in each time domain unit (including an uplink time domain unit and a downlink time domain unit), refer to a timing definition of each data region or each control region in another time domain unit. For example, a total of 10 uplink time domain units are divided in time domain. If a timing rule for each time domain region in a first uplink time domain unit is defined, the communications device may directly use the timing rule of the first uplink time domain unit when using other nine uplink time domain units, and successively uses a length of an uplink time domain unit as a multiple. For example, if a timing offset of a second uplink timing boundary in the first uplink time domain unit relative to a first downlink timing boundary is $T_2^{ul}$, a timing offset of a second uplink timing boundary in a second uplink time domain unit relative to a first downlink timing boundary in a downlink time domain unit corresponding to the second uplink time domain unit is $T_2^{ul}$, and so on. A timing advancement of a second uplink timing boundary in each uplink time domain unit is an offset of the second uplink timing boundary relative to a first downlink timing boundary in an uplink time domain unit in which the second uplink timing boundary is currently included. Likewise, for timing adjustment performed on the second uplink timing boundary, the third uplink timing boundary, the second downlink timing boundary, and the third downlink timing boundary, refer to the descriptions herein. Details are not described.

For ease of understanding, the following uses an example in which timing advancement is defined for the first uplink timing boundary, the second uplink timing boundary, or the third uplink timing boundary relative to the first downlink timing boundary and timing advancement is defined for the second downlink timing boundary and the third downlink timing boundary relative to the first downlink timing boundary, and the following several scenarios are included based on a composition structure of a time domain unit.

1. Both a downlink time domain unit and an uplink time domain unit corresponding to the downlink time domain unit include an uplink time domain region and a downlink time domain region.

For example, as shown in FIG. 5-1, delay is defined for receive timing of DL2 in a cell 1 relative to a downlink timing boundary of DL1 in the cell 1, and advancement is defined for transmit timing of UL2 in a cell 2 relative to the downlink timing boundary of the DL1 in the cell 1. In this way, a symbol 2 in the DL2 and a symbol 3 in the UL2 are received at the same time at a network side receive end of the cell 2, a symbol 3 in the DL2 and a symbol 4 in the UL2 are received at the same time at the network side receive end of the cell 2, . . . , a symbol 11 in the DL2 and a symbol 12 in the UL2 are received at the same time at the network side receive end of the cell 2, and so on. Details are not described. In a time domain unit structure shown in FIG. 5-1, the DL2 in the cell 1 and the UL2 in the cell 2 have a same receiving start moment at the network side of the cell 2 and have a same receiving end moment at the network side of the cell 2.

For another example, as shown in FIG. 5-2, if receive timing of DL2 in a cell 1 is delayed by duration $\Delta T_1^{dl,min}$+$T_{symbol}$, to ensure that an error between receiving start moments of the DL2 in the cell 1 and UL2 in a cell 2 at a network side of the cell 2 falls within a proper range (namely, almost at a same moment), the UL2 in the cell 2 needs to be advanced by longer duration when transmit timing advancement is defined for the UL2 in the cell 2. A maximum length of the UL2 may be set to nine symbols. In this way, a symbol 2 in the DL2 and a symbol 5 in the UL2 can be received at the same time at the network side receive end of the cell 2, a symbol 3 in the DL2 and a symbol 6 in the UL2 can be received at the same time at the network side receive end of the cell 2, . . . , and a symbol 9 in the DL2 and a symbol 12 in the UL2 can be received at the same time at the network side receive end of the cell 2.

2. A downlink time domain unit includes an uplink time domain region and a downlink time domain region, and an uplink time domain unit corresponding to the downlink time domain unit includes an uplink time domain region.

As shown in FIG. 5-3, advancement is defined for transmit timing of UL2 in a cell 2 relative to a downlink timing boundary of DL1 in a cell 1, advancement is defined for transmit timing of UL3 in the cell 2 relative to the downlink timing boundary of the DL1 in the cell 1, delay is defined for receive timing of DL2 in the cell 1 relative to the downlink timing boundary of the DL1 in the cell 1, and advancement is defined for transmit timing of UL1, UL2, and UL3 in the cell 2 relative to the downlink timing boundary of the DL1 in the cell 1. In this way, a symbol 0 in the DL2 and a symbol 2 in the UL2 are received at the same time at a network side receive end of the cell 2, a symbol 2 in the DL2 and a symbol 3 in the UL2 are received at the same time at the network side receive end of the cell 2, a symbol 3 in the DL2 and a symbol 4 in the UL2 are received at the same time at the network side receive end of the cell 2, . . . , a symbol 11 in the DL2 and a symbol 12 in the UL2 are received at the same time at the network side receive end of the cell 2, and so on. Details are not described. In a time domain unit structure shown in FIG. 5-2, the DL1 in the cell 1 and the UL3 in the cell 2 have a same receiving start moment at the network side of the cell 2, and the DL2 in the cell 1 and the UL2 in the cell 2 have a same receiving start moment at the network side of the cell 2 and a same receiving end moment at the network side of the cell 2.

It should be noted that the same receiving time at the network side receive end of the cell 2 in this embodiment of the present invention means that both the receiving start moments and the receiving end moments are the same, but does not mean that only total receiving duration is the same.

3. A downlink time domain unit includes a downlink time domain region, and an uplink time domain unit corresponding to the downlink time domain unit includes an uplink time domain region and a downlink time domain region.

As shown in FIG. 5-4, delay is defined for receive timing of DL2 in a cell 1 relative to a downlink timing boundary of DL1 in the cell 1, and advancement is defined for transmit timing of UL2 in a cell 2 relative to the downlink timing boundary of the DL1 in the cell 1. In this way, a symbol 2 in the DL2 and a symbol 4 in the UL2 are received at the same time at a network side receive end of the cell 2, a symbol 3 in the DL2 and a symbol 5 in the UL2 are received at the same time at the network side receive end of the cell 2 . . . and a symbol 10 in the DL2 and a symbol 12 in the UL2 are received at the same time at the network side receive end of the cell 2. Therefore, the DL2 and the UL2 have a same receiving end moment at the network side receive end of the cell 2, so that an interference immunity and cancellation algorithm can have higher performance and simplify an operation, so as to obtain a better anti-interference effect.

In FIG. 5-4, delay is defined for receive timing of the DL2 in the cell 1 relative to the downlink timing boundary of the DL1 in the cell 1, and advancement is defined for transmit timing of the UL2 in the cell 2 relative to the downlink timing boundary of the DL1 in the cell 1. In this way, $\Delta T_1^{ul} - \Delta T_2^{dl} - \Delta T_1^{dl}$, and a timing offset is reduced.

4. A downlink time domain unit includes a downlink time domain region, and an uplink time domain unit corresponding to the downlink time domain unit includes an uplink time domain region.

As shown in FIG. 5-5, delay is defined for receive timing of DL2 in a cell 1 relative to a downlink timing boundary of DL1 in the cell 1, and advancement is defined for transmit timing of UL2 and UL3 in a cell 2 relative to the downlink timing boundary of the DL1 in the cell 1. In this way, a symbol 2 in the DL2 and a symbol 4 in the UL2 are received at the same time at a network side receive end of the cell 2, a symbol 3 in the DL2 and a symbol 5 in the UL2 are received at the same time at the network side receive end of the cell 2, ..., and a symbol 10 in the DL2 and a symbol 12 in the UL2 are received at the same time at the network side receive end of the cell 2. Further, the DL in the cell 1 and the UL3 in the cell 2 have a same receiving start moment at the network side of the cell 2 and have a same receiving end moment at the network side of the cell 2.

Figures 1, 6:
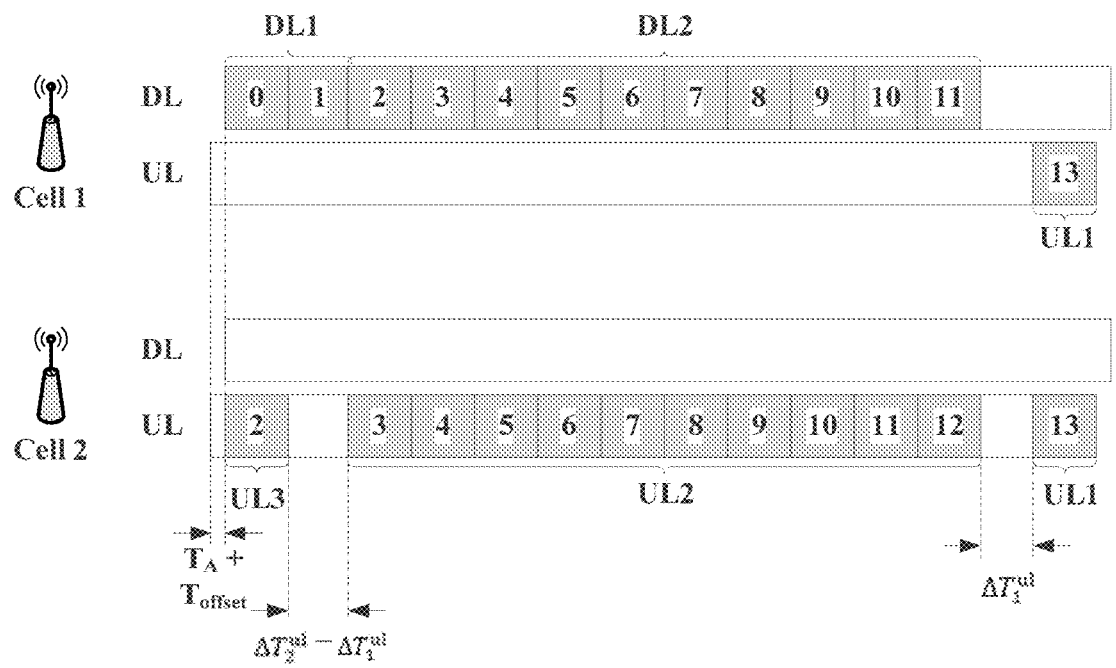
Figures 2, 6:
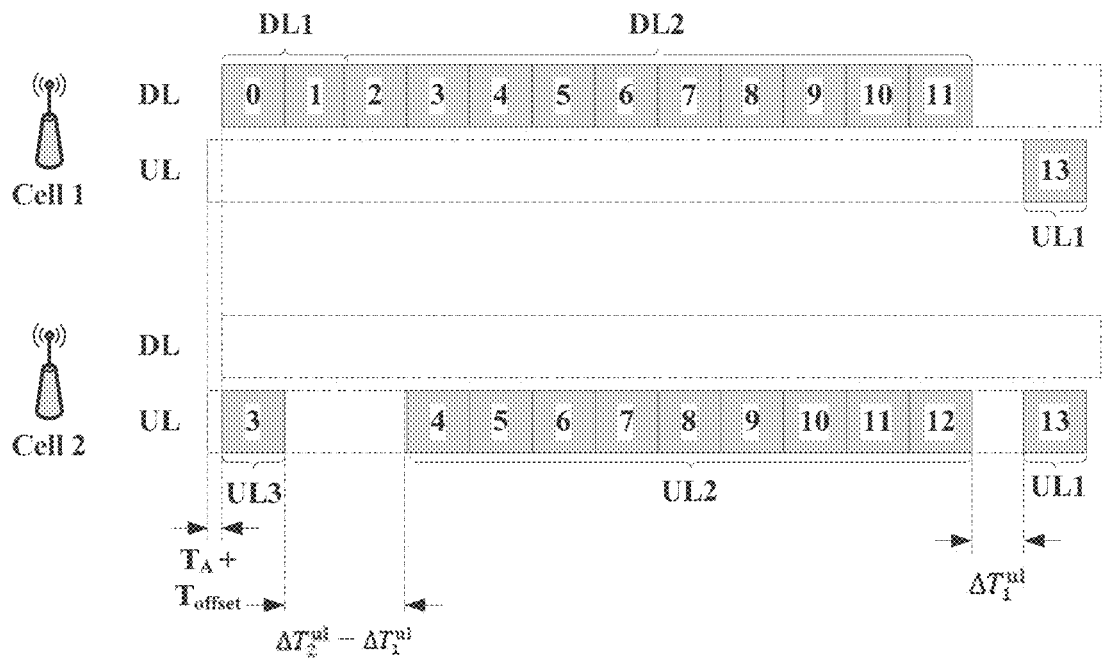
Figures 3, 6:
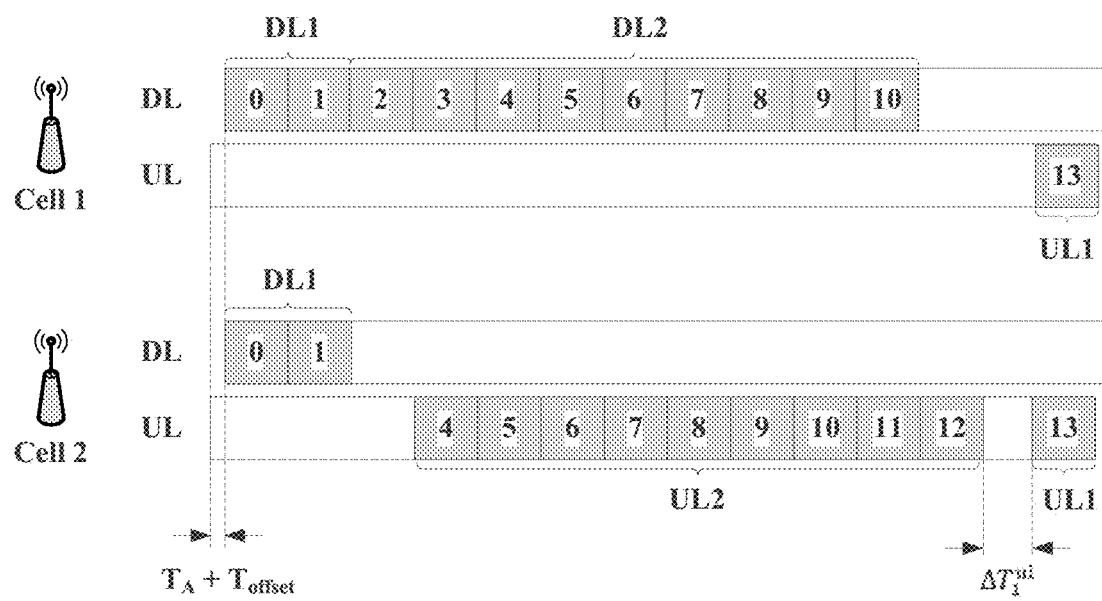

Alternatively, in some scenarios, transmit timing of only an uplink time domain region may be adjusted, and receive timing of a downlink time domain region is not adjusted. As shown in FIG. 6-1 or FIG. 6-2, UL1, UL2, and UL3 are adjusted, so that the UL3 in a cell 2 and DL1 in a cell 1 have a same receiving start moment at a network side of the cell 2, and the UL2 in the cell 2 and the DL2 in the cell 1 have a same receiving end moment at the network side of the cell 2.

In FIG. 6-1, symbols (3 to 12) of the UL2 in the cell 2 and symbols (2 to 11) of the DL2 in the cell 1 are located at a same location in time domain, and a symbol 2 of the UL3 in the cell 2 and a symbol 0 of the DL1 in the cell 1 are received at the same time at the network side receive end of the cell 2. Duration by which the UL2 is advanced relative to a first downlink timing boundary may be defined as $T_2^{ul}$, and $\Delta T_2^{ul} = \Delta T_1^{ul} + T_{symbol}$.

In FIG. 6-2, symbols (4 to 12) of the UL2 in the cell 2 and symbols (3 to 11) of the DL2 in the cell 1 are located at a same location in time domain, and a symbol (3) of the UL3 in the cell 2 and a symbol (0) of the DL1 in the cell 1 are received at the same time at the network side receive end of the cell 2. Duration by which an uplink timing boundary of the UL2 is advanced relative to a first downlink timing boundary may be defined as $T_2^{ul}$, and $\Delta T_2^{ul} = \Delta T_1^{ul} + 2T_{symbol}$.

As shown in FIG. 6-3, certainly, that UL2 in a cell 2 and DL2 in a cell 1 have a same receiving start moment at a network side of the cell 2 may be alternatively defined. In this way, symbols (4 to 11) of the UL2 in the cell 2 and symbols (3 to 10) of the DL2 in the cell 1 are received at the same time at the network side receive end of the cell 2.

Likewise, alternatively, receive timing of only a downlink time domain region may be adjusted.

The foregoing describes the signal transmission method in the embodiments of the present invention, and the following describes a communications device for performing the method.

Figure 9:
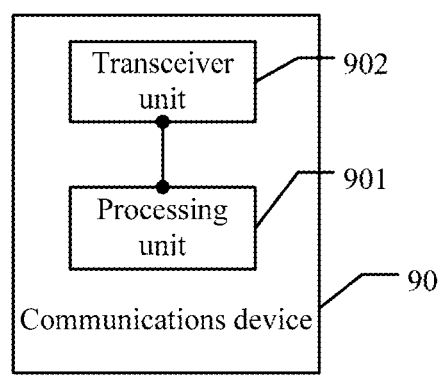
FIG. 9 is a schematic structural diagram of a communications device according to an embodiment of the present invention.

First, referring to FIG. 9, a communications device 90 is described. The communications device 90 predefines a transmission pattern. For a definition of the transmission pattern, refer to the above-mentioned content. Details are not described herein again. In this embodiment of the present invention, the communications device 90 includes a processing unit 901 and a transceiver unit 902.

The processing unit 901 is configured to determine the preset transmission pattern.

The transceiver unit 902 is configured to transmit a signal based on the transmission pattern determined by the processing unit 901, and the transceiver unit 902 may include a receiving unit and a sending unit. A terminal device may perform downlink receiving by using the receiving unit and perform uplink sending by using the sending unit, and a network side device may perform uplink receiving by using the receiving unit and perform downlink sending by using the sending unit.

The transmission pattern includes a downlink time domain unit and/or an uplink time domain unit. The downlink time domain unit includes $N_1$ downlink time domain regions, and each downlink time domain region has a downlink timing boundary. The uplink time domain unit includes $N_2$ uplink time domain regions, and each uplink time domain region has an uplink timing boundary, where $N_1 \geq 2$ and $N_2 \geq 2$. The transmission pattern satisfies at least one of the following:

a downlink timing boundary of an $i^{th}$ downlink time domain region in the downlink time domain unit is later than a first downlink timing boundary, where i is a positive integer greater than 1 and less than or equal to $N_1$;

a downlink timing boundary of a $j^{th}$ downlink time domain region in the downlink time domain unit is earlier than a first downlink timing boundary, where j is a positive integer greater than 1 and less than or equal to $N_1$;

an uplink timing boundary of a $k^{th}$ uplink time domain region in the uplink time domain unit is earlier than a first downlink timing boundary, where k is a positive integer greater than or equal to 1 and less than or equal to $N_2$; or an uplink timing boundary of an $m^{th}$ uplink time domain region in the uplink time domain unit is later than a first downlink timing boundary, where m is a positive integer greater than 1 and less than or equal to $N_2$.

In this embodiment of the present invention, the communications device 90 transmits the signal by using the predefined transmission pattern. In the transmission pattern, that a non-first downlink timing boundary in the downlink time domain unit is later than or earlier than the first downlink timing boundary is defined, and that any uplink timing boundary in the uplink time domain unit is later than or earlier than the first downlink timing boundary is defined. In this way, if the communications device transmits the signal by using the transmission pattern, symbols between different cells can be located at a same location in time domain, and therefore uplink-downlink interference between the cells is effectively canceled.

In addition, for definitions of a first to a third uplink timing boundaries and definitions of the first to third downlink timing boundaries, refer to the foregoing method embodiments. The communications device in this embodiment of the present invention can perform the content described in any one of the foregoing method embodiments (including the embodiments shown in FIG. 2-1 to FIG. 8-2). Details are not described herein again.

Figure 10:
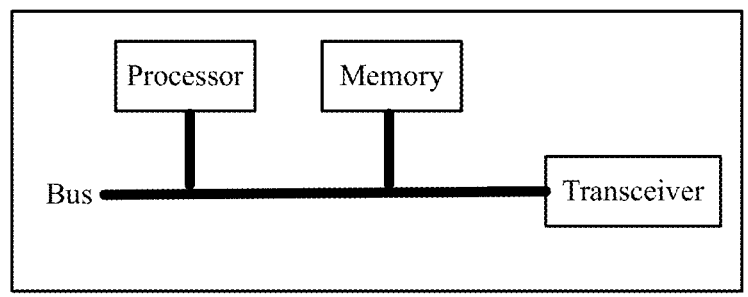
FIG. 10 is a schematic structural diagram of a physical apparatus for performing a signal transmission method according to an embodiment of the present invention.

It should be noted that a physical device corresponding to the transceiver unit (including the receiving unit and the sending unit) in the embodiment corresponding to FIG. 9 may be a transceiver (including a receiver and a transmitter), and a physical device corresponding to all processing units may be a processor. The apparatus shown in FIG. 9 may have a structure shown in FIG. 10. When the apparatus has the structure shown in FIG. 10, a processor and a transceiver in FIG. 10 implement functions the same as or similar to those of the processing unit and the transceiver unit that are provided in the foregoing apparatus embodiment corresponding to the apparatus. A memory in FIG. 10 stores program code that needs to be invoked by the processor during performing the foregoing signal transmission method.

In the foregoing embodiments, the description of the embodiments has respective focuses. For a part that is not described in detail in an embodiment, refer to related descriptions in other embodiments.

It may be clearly understood by a person skilled in the art that, for the purpose of convenient and brief description, for detailed working processes of the foregoing system, apparatus, and module, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the module division is merely logical function division and may be other division during actual implementation. For example, a plurality of modules or components may be combined or integrated into another system, or some features may be ignored or not performed. In addition, the displayed or discussed mutual couplings or direct couplings or communications connections may be implemented through some interfaces. The indirect couplings or communications connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all the modules may be selected according to actual requirements to achieve the objectives of the solutions of the embodiments.

In addition, functional modules in the embodiments of the present invention may be integrated into one processing module, or each module may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of the embodiments of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (English full name: Read-Only Memory, ROM for short), a random access memory (English full name: Random Access Memory, RAM for short), a magnetic disk, or an optical disc.

The technical solutions provided in the embodiments of the present invention are described in detail above. The principle and implementation of the embodiments of the present invention are described herein through specific examples. The descriptions about the foregoing embodiments are merely intended to help understand the method and core ideas of the present invention. In addition, a person of ordinary skill in the art may make modifications to the specific implementations and the application scopes according to the ideas of the embodiments of the present invention.

Therefore, the content of this specification shall not be construed as a limit to the embodiments of the present invention.

What is claimed is:

1. A signal transmission method, wherein the method comprises:
    transmitting a signal based on a preset transmission pattern, wherein
    the transmission pattern comprises at least one of a downlink time domain unit or an uplink time domain unit, wherein the downlink time domain unit comprises $N_1$ downlink time domain regions, wherein each downlink time domain region has a downlink timing boundary, wherein the uplink time domain unit comprises $N_2$ uplink time domain regions, wherein each uplink time domain region has an uplink timing boundary, wherein $N_1 \geq 2$, and $N_2 \geq 2$, and wherein the transmission pattern satisfies at least one of the following:
        a downlink timing boundary of an $i^{th}$ downlink time domain region in the downlink time domain unit is later than a first downlink timing boundary, wherein i is a positive integer greater than 1 and less than or equal to $N_1$;
        a downlink timing boundary of a $j^{th}$ downlink time domain region in the downlink time domain unit is earlier than a first downlink timing boundary, wherein j is a positive integer greater than 1 and less than or equal to $N_1$;
        an uplink timing boundary of a $k^{th}$ uplink time domain region in the uplink time domain unit is earlier than a first downlink timing boundary, wherein k is a positive integer greater than or equal to 1 and less than or equal to $N_2$; or
        an uplink timing boundary of an $m^{th}$ uplink time domain region in the uplink time domain unit is later than a first downlink timing boundary, wherein m is a positive integer greater than 1 and less than or equal to $N_2$;
    wherein a downlink timing boundary of an $x^{th}$ downlink region is stipulated as follows: receiving timing of a symbol having an index number p in the $x^{th}$ downlink time domain region comprises determining the following: downlink timing boundary of the $x^{th}$ downlink region$+p*T_{symbol}$, wherein $T_{symbol}$ is a length occupied by a symbol in time domain, and x is i or j; and
    wherein an uplink timing boundary of a $y^{th}$ uplink region is stipulated as follows: transmitting timing of a symbol having an index number p in the $y^{th}$ uplink time domain region comprises determining the following: uplink timing boundary of the $y^{th}$ uplink region$+p*T_{symbol}$, wherein y is k or m, p is any positive integer from 0 to t−1, wherein t is a total quantity of symbols comprised in a time domain unit, and wherein an index number of a symbol starts from 0 and is arranged in ascending order of time domain.

2. The method according to claim 1, wherein when k=2, an uplink timing boundary of a second uplink time domain region in the uplink time domain unit is earlier than the first downlink timing boundary by duration $T_2^{ul}=T_1^{ul}+\Delta T_1^{ul}$, wherein $T_1^{ul}$ is duration by which an uplink timing boundary of a first uplink time domain region in the uplink time domain unit is earlier than the first downlink timing boundary, and wherein $\Delta T_1^{ul}$ is an offset between the uplink timing boundary of the second uplink time domain region and the uplink timing boundary of the first uplink time domain region.

3. The method according to claim 2, wherein $\Delta T_1^{ul}$ is a predefined first fixed value or any value in a predefined first set, wherein a quantity of elements in the first set is related to a quantity of symbols comprised in the second uplink time domain region, and wherein the second uplink time domain region comprises a symbol transmitted based on the uplink timing boundary of the second uplink time domain region.

4. The method according to claim 1, wherein when k=3, an uplink timing boundary of a third uplink time domain region in the uplink time domain unit is earlier than the first downlink timing boundary by duration $T_3^{ul}=T_1^{ul}+\Delta T_2^{ul}$, wherein $\Delta T_2^{ul}$ is an offset between the uplink timing boundary of the third uplink time domain region and the uplink timing boundary of the first uplink time domain region.

5. The method according to claim 4, wherein $\Delta T_2^{ul}$ is a predefined second fixed value or any value in a predefined second set, wherein a quantity of elements in the second set is related to a quantity of symbols comprised in the third uplink time domain region, and wherein the third uplink time domain region comprises a symbol transmitted based on the uplink timing boundary of the third uplink time domain region.

6. The method according to claim 1, wherein when i=2, a downlink timing boundary of a second downlink time domain region in the downlink time domain unit is later than the first downlink timing boundary by duration $T_2^{dl}$, $T_2^{dl}=\Delta T_1^{dl}$, wherein $\Delta T_1^{dl}$ is an offset between the downlink timing boundary of the second downlink time domain region and the first downlink timing boundary.

7. The method according to claim 6, wherein $\Delta T_1^{dl}$ is a predefined third fixed value or any value in a predefined third set, wherein a quantity of elements in the third set is related to a quantity of symbols comprised in the second downlink time domain region, and wherein the second downlink time domain region comprises a symbol transmitted based on the downlink timing boundary of the second downlink time domain region.

8. The method according to claim 1, wherein when i=3, a downlink timing boundary of a third downlink time domain region in the downlink time domain unit is later than the first downlink timing boundary by duration $T_3^{dl}$, $T_3^{dl}=\Delta T_2^{dl}$, wherein $\Delta T_2^{dl}$ is an offset between the downlink timing boundary of the third downlink time domain region and the first downlink timing boundary.

9. The method according to claim 8, wherein $\Delta T_2^{dl}$ is a predefined fourth fixed value or any value in a predefined fourth set, wherein a quantity of elements in the fourth set is related to a quantity of symbols comprised in the third downlink time domain region, and wherein the third downlink time domain region comprises a symbol transmitted based on the downlink timing boundary of the third downlink time domain region.

10. The method according to claim 1, wherein when m=2, an uplink timing boundary of a second uplink time domain region in the uplink time domain unit is later than the first downlink timing boundary by duration $T_2^{ul'}=\Delta T_1^{ul'}$, wherein $\Delta T_1^{ul'}$ is an offset between the uplink timing boundary of the second uplink time domain region and an uplink timing boundary of the first uplink time domain region.

11. The method according to claim 10, wherein $\Delta T_1^{ul'}$ is a predefined fifth fixed value or any value in a predefined fifth set, wherein a quantity of elements in the fifth set is related to a quantity of symbols comprised in the second uplink time domain region, and wherein the second uplink time domain region comprises a symbol transmitted based on the uplink timing boundary of the second uplink time domain region.

12. The method according to claim 1, wherein when m=3, an uplink timing boundary of a third uplink time domain region in the uplink time domain unit is later than the first downlink timing boundary by duration $T_3^{ul'}=\Delta T_2^{ul'}$, wherein $\Delta T_2^{ul'}$ is an offset between the uplink timing boundary of the third uplink time domain region and the uplink timing boundary of the first uplink time domain region.

13. The method according to claim 12, wherein $\Delta T_2^{ul'}$ is a predefined sixth fixed value or any value in a predefined sixth set, wherein a quantity of elements in the sixth set is related to a quantity of symbols comprised in the third uplink time domain region, and wherein the third uplink time domain region comprises a symbol transmitted based on the uplink timing boundary of the third uplink time domain region.

14. The method according to claim 1, wherein when j=2, a downlink timing boundary of a second downlink time domain region in the downlink time domain unit is earlier than the first downlink timing boundary by duration $T_2^{dl'}$, $T_2^{dl'}=\Delta T_1^{dl'}$, wherein $\Delta T_1^{dl'}$ is an offset between the downlink timing boundary of the second downlink time domain region and the first downlink timing boundary.

15. The method according to claim 14, wherein $\Delta T_1^{dl'}$ is a predefined seventh fixed value or any value in a predefined seventh set, wherein a quantity of elements in the seventh set is related to a quantity of symbols comprised in the second downlink time domain region, and wherein the second downlink time domain region comprises a symbol transmitted based on the downlink timing boundary of the second downlink time domain region.

16. The method according to claim 1, wherein when j=3, a downlink timing boundary of a third downlink time domain region in the downlink time domain unit is earlier than the first downlink timing boundary by duration $T_3^{dl'}$, $T_3^{dl'}=\Delta T_2^{dl'}$, wherein $\Delta T_2^{dl'}$ is an offset between the downlink timing boundary of the third downlink time domain region and the first downlink timing boundary.

17. The method according to claim 16, wherein $\Delta T_2^{dl'}$ is a predefined eighth fixed value or any value in a predefined eighth set, wherein a quantity of elements in the eighth set is related to a quantity of symbols comprised in the third downlink time domain region, and wherein the third downlink time domain region comprises a symbol transmitted based on the downlink timing boundary of the third downlink time domain region.

18. A communications device, wherein the communications device comprises:
   at least one processor; and
   a non-transitory computer-readable storage medium coupled to the at least one processor and storing programming instructions for execution by the at least one processor, wherein the programming instructions instruct the at least one processor to:
   transmit a signal based on a preset transmission pattern, wherein
   the transmission pattern comprises at least one of a downlink time domain unit or an uplink time domain unit, wherein the downlink time domain unit comprises $N_1$ downlink time domain regions, wherein each downlink time domain region has a downlink timing boundary, wherein the uplink time domain unit comprises $N_2$ uplink time domain regions, wherein each uplink time domain region has an uplink timing boundary, wherein $N_1 \geq 2$, and $N_2 \geq 2$, and wherein the transmission pattern satisfies at least one of the following:
- a downlink timing boundary of an $i^{th}$ downlink time domain region in the downlink time domain unit is later than a first downlink timing boundary, wherein i is a positive integer greater than 1 and less than or equal to $N_1$;
- a downlink timing boundary of a $j^{th}$ downlink time domain region in the downlink time domain unit is earlier than a first downlink timing boundary, wherein j is a positive integer greater than 1 and less than or equal to $N_1$;
- an uplink timing boundary of a $k^{th}$ uplink time domain region in the uplink time domain unit is earlier than a first downlink timing boundary, wherein k is a positive integer greater than or equal to 1 and less than or equal to $N_2$; or
- an uplink timing boundary of an $m^{th}$ uplink time domain region in the uplink time domain unit is later than a first downlink timing boundary, wherein m is a positive integer greater than 1 and less than or equal to $N_2$;
- wherein a downlink timing boundary of an $x^{th}$ downlink region is stipulated as follows: receiving timing of a symbol having an index number p in the $x^{th}$ downlink time domain region comprises determining the following: downlink timing boundary of the $x^{th}$ downlink region+$p*T_{symbol}$, wherein $T_{symbol}$ is a length occupied by a symbol in time domain, and x is i or j; and
- wherein an uplink timing boundary of a $y^{th}$ uplink region is stipulated as follows: transmitting timing of a symbol having an index number p in the $y^{th}$ uplink time domain region comprises determining the following: uplink timing boundary of the $y^{th}$ uplink region+$p*T_{symbol}$, wherein y is k or m, p is any positive integer from 0 to t−1, wherein t is a total quantity of symbols comprised in a time domain unit, and wherein an index number of a symbol starts from 0 and is arranged in ascending order of time domain.

19. A non-transitory computer-readable storage medium, comprising executable instructions, wherein the executable instructions, when executed by a computer, cause the computer to transmit a signal based on a preset transmission pattern, wherein the transmission pattern comprises at least one of a downlink time domain unit or an uplink time domain unit, wherein the downlink time domain unit comprises $N_1$ downlink time domain regions, wherein each downlink time domain region has a downlink timing boundary, wherein the uplink time domain unit comprises $N_2$ uplink time domain regions, wherein each uplink time domain region has an uplink timing boundary, wherein $N_1 \geq 2$, and $N_2 \geq 2$, and wherein the transmission pattern satisfies at least one of the following:
- a downlink timing boundary of an $i^{th}$ downlink time domain region in the downlink time domain unit is later than a first downlink timing boundary, wherein i is a positive integer greater than 1 and less than or equal to $N_1$;
- a downlink timing boundary of a $j^{th}$ downlink time domain region in the downlink time domain unit is earlier than a first downlink timing boundary, wherein j is a positive integer greater than 1 and less than or equal to $N_1$;
- an uplink timing boundary of a $k^{th}$ uplink time domain region in the uplink time domain unit is earlier than a first downlink timing boundary, wherein k is a positive integer greater than or equal to 1 and less than or equal to $N_2$; or
- an uplink timing boundary of an $m^{th}$ uplink time domain region in the uplink time domain unit is later than a first downlink timing boundary, wherein m is a positive integer greater than 1 and less than or equal to $N_2$;
- wherein a downlink timing boundary of an $x^{th}$ downlink region is stipulated as follows: receiving timing of a symbol having an index number p in the $x^{th}$ downlink time domain region comprises determining the following: downlink timing boundary of the $x^{th}$ downlink region+$p*T_{symbol}$, wherein $T_{symbol}$ is a length occupied by a symbol in time domain, and x is i or j; and
- wherein an uplink timing boundary of a $y^{th}$ uplink region is stipulated as follows: transmitting timing of a symbol having an index number p in the $y^{th}$ uplink time domain region comprises determining the following: uplink timing boundary of the $y^{th}$ uplink region+$p*T_{symbol}$, wherein y is k or m, p is any positive integer from 0 to t−1, wherein t is a total quantity of symbols comprised in a time domain unit, and wherein an index number of a symbol starts from 0 and is arranged in ascending order of time domain.

\* \* \* \* \*